US012709142B1

(12) United States Patent
Zheng et al.

(10) Patent No.: US 12,709,142 B1
(45) Date of Patent: Aug. 18, 2026

(54) VEHICLE COVER

(71) Applicant: Suzhou Mustron Automotive Technology Co., Ltd., Suzhou (CN)

(72) Inventors: Shaoyong Zheng, Suzhou (CN); Jian Sun, Suzhou (CN)

(73) Assignee: Suzhou Mustron Automotive Technology Co., Ltd., Suzhou (CN)

( * ) Notice: Subject to any disclaimer, the term of this patent is extended or adjusted under 35 U.S.C. 154(b) by 0 days.

(21) Appl. No.: 19/536,172

(22) Filed: Feb. 10, 2026

(51) Int. Cl.
*B60J 11/04* (2006.01)
*B60J 7/14* (2006.01)
*B60J 11/06* (2006.01)
*F16B 37/08* (2006.01)

(52) U.S. Cl.
CPC ............... *B60J 11/04* (2013.01); *B60J 7/141* (2013.01); *B60J 11/06* (2013.01); *F16B 37/0892* (2013.01)

(58) Field of Classification Search
CPC .................................. B60J 7/141; B60J 11/06
See application file for complete search history.

(56) References Cited

U.S. PATENT DOCUMENTS 6,827,389 B1 * 12/2004 Pandorf .................. B60J 7/141 296/100.09
7,537,264 B2 * 5/2009 Maimin .................... B60P 7/02 296/100.09
9,421,851 B2 * 8/2016 Kerr, III .................. B60J 7/198
10,189,340 B2 * 1/2019 Schmeichel ............. B60J 7/141
11,890,921 B2 * 2/2024 Qiu .......................... B60J 7/198
2015/0123421 A1 * 5/2015 Combs, II ................ B60J 10/80 296/100.02
2017/0120736 A1 * 5/2017 Lutzka ..................... B60J 7/185
2021/0053427 A1 * 2/2021 Gu ........................... B60J 10/32
2023/0382208 A1 * 11/2023 Wu .......................... B60J 7/141

* cited by examiner

*Primary Examiner* — Aaron L Lembo
(74) *Attorney, Agent, or Firm* — K&L Gates LLP

(57) ABSTRACT

A vehicle cover comprising a support system, a guide rail system, a front bar system, a rotating shaft system, a rear bar, a latch system, and side rails. The front bar system, the rotating shaft system, and the rear bar together form a transverse frame of the vehicle cover, while the side rails and joints are connected to two ends of the transverse frame to form a longitudinal frame of the vehicle cover. The joints comprise all joints that connected to the front bar system, the rotating shaft system, and the rear bar.

12 Claims, 20 Drawing Sheets

VEHICLE COVER

TECHNICAL FIELD

Present invention is relevant to technical field of automotive parts, especially an easy to install vehicle cover.

BACKGROUND OF THE INVENTION

Pickup trucks (also known as sedan-truck) are equipped with a hopper for cargo carrying. Since the cargo hopper of a pickup truck is open, in order to prevent goods in the cargo hopper from being exposed to rain or snow during inclement weather, vehicle covers have been developed, by installing a vehicle cover on the cargo hopper of the pickup truck, the cover serves to shield the goods inside the cargo hopper and prevent them from getting drenched by rain.

Most existing car covers require pre-positioning during installation, in which positioning points must be identified prior to mounting the vehicle cover, and due to the large size and heavy weight of the cover as a whole, the installation process is cumbersome and inconvenient. Moreover, existing car covers cannot be adjusted to different angles in accordance with actual usage requirements when opened; they can only be opened upright or flat, thereby limiting their range of applicability.

SUMMARY OF THE INVENTION

The purpose of this invention is to facilitate the positioning and installation of the vehicle cover by modifying its structure, such that the installation can be completed by a single person.

In order to solve the above problems of the prior art, the technical solution adopted in the invention is as follows:

An easy-to-install vehicle cover comprising a support system, a guide rail system, a front bar system, a rotating shaft system, a rear bar, a latch system, and side rails, the front bar system, the rotating shaft system, and the rear bar together form a transverse frame of the vehicle cover, the side rails and joints are connected to two ends of the transverse frame to form a longitudinal frame of the vehicle cover, the joints comprise all joints that connected to the front bar system, the rotating shaft system, and the rear bar.

The latch system comprises two latch assemblies, which are connected by a steel wire rope, each latch assembly comprises a latch, a first outer frame, a second outer frame, and a spring;

The first outer frame is connected with the second outer frame, the steel wire rope passes through the first outer frame and the second outer frame, the two ends of the steel wire rope are respectively connected to the two latches, the spring is sleeved on the steel wire rope and is located within the cavity of the first outer frame, the two ends of the spring respectively abut against the latch and the second outer frame, the first outer frame is connected with a gasket, wherein the gasket is higher than the first outer frame, so that during flipping of the vehicle cover, the gasket provides effective cushioning to avoid rigid contact between the vehicle cover and the latch.

The guide rail system is connected with a limiting frame, the limiting frame is configured to limit the latch that connected to the front bar system. By providing the limiting frame to limit the latch on the front bar system, positioning of the entire vehicle cover is achieved, moreover, by providing the latch system, the vehicle cover can be connected to the guide rail system simply by pressing, on one hand, the latch is received within the limiting frame to complete positioning of the vehicle cover, and on the other hand, the latch is engaged with the guide rail system to complete connection between the front bar system and the guide rail system.

The steel wire rope is connected with a handle webbing. The handle webbing is located between the first outer frame and the second outer frame, when the handle webbing is pulled, the steel wire rope drives the two latches to retract, thereby separating the latches to disengage from the side rails and then realizing unlocking.

Further, the front bar system comprises a first front bar, a second front bar, a third front bar, a front bar rubber strip, front bar joints, a front bar buckle head, front bar rotating-shaft joints, and joint screws;

The first front bar and the second front bar are bonded together, with two ends of the first front bar and two ends of the second front bar fixed by the front bar joints, the second front bar and the third front bar are connected through a rotating shaft structure, the front bar rubber strip is connected between the second front bar and the third front bar, the front bar rubber strip is configured to prevent water from entering the rotating shaft of the vehicle cover. The front bar rubber strip comprises a rubber strip blade, the rubber strip blade is connected with two T-shaped rubber strip insertion heads, which are respectively connected to the second front bar and the third front bar, the rubber strip blade is located on an upper side of the rotating shaft structure.

Further, the front bar buckle head is connected to the first front bar and the second front bar, the front bar rotating-shaft joints are connected to two ends of the third front bar, the joint screws pass through the front bar joints and are connected to the guide rail system, so as to fix the front bar system to the guide rail system. The front bar joints are connected to the first front bar and the second front bar, since the first front bar and the second front bar do not need to rotate and only require stable connection, joint fixing holes are provided on the front bar joints, allowing the front bar joints to connected with the guide rail by screws. In addition, the edge of the joint fixing holes are higher than the upper plane of the front bar joints, which prevents rainwater from flowing into the fixing holes in rainy days, providing excellent waterproofing performance. The front bar buckle head is provided with an insertion opening, a support groove, and a buckle-head groove, the insertion opening is configured to connect a buckle, a drainage outlet is formed at the bottom of the support groove, the buckle-head groove is configured to mount a support gasket. The insertion opening is configured to connect a webbing, wherein one end of the webbing is connected to the vehicle cover, and the other end is provided with a buckle which is matched with the insertion opening. Since the vehicle cover needs to be supported on the support gasket after being fully erected, extra support groove is provided to enhance strength of the front bar buckle head and prevent deformation of the insertion opening, the central reinforcing rib further strength of the front bar buckle head. To prevent water accumulation in the support groove, the drainage outlet is provided near the bottom of the support groove to discharge accumulated water. The front bar buckle head is provided with a fixing threaded hole and is connected to the front bar system through the fixing threaded hole.

Further, the second front bar is provided with a second front bar circular hook and a second front bar adhesive surface, the end of the second front bar circular hook is provided with a protruding blocking head, the third front bar is provided with a third front bar rotating shaft and a stepped protrusion, the second front bar circular hook is rotatably connected to the third front bar rotating shaft, and the second front bar circular hook rotates about the third front bar rotating shaft, the protruding blocking head and the stepped protrusion form a blocking structure, thereby when the protruding blocking head abuts against the stepped protrusion, the second front bar rotates to a maximum rotation angle.

Further, the first front bar is provided with a first front bar adhesive surface, a C-shaped groove, a first rubber strip insertion opening, a first connection port, and a second connection port, the first front bar adhesive surface is bonded with the second front bar adhesive surface by glue, the C-shaped groove is configured to connect the latch system, and the opening of the C-shaped groove is arranged facing downward for connection with the latch system.

Further, the front bar joint is provided with a joint insertion head and a joint screw hole, the first connection port is configured to connect the joint screw hole, the second connection port is configured to connect the joint insertion head, wherein the second connection port has a substantially semicircular structure. There are two first connection ports, which are located on both sides of the C-shaped groove, and the two second connection ports are located on the side of the first connection port away from the C-shaped groove. The first rubber strip insertion opening is connected with a rubber strip and is provided with an anti-detachment protrusion (not shown). The rubber strip connected to the first rubber strip insertion opening is located at the end of a cargo hopper, and part of the rubber strip extends between the cab and the cargo hopper, which effectively cover the cargo hopper and thereby deliver superior waterproofing performance.

Further, the front bar joint comprises a joint fixing hole, a C-shaped rubber-through joint hole, a joint insertion head, a joint screw hole, a gasket area, a profile-connecting protrusion, joint reinforcing ribs, and a joint insertion area, the C-shaped rubber-through joint hole is configured to connect the T-shaped rubber strip insertion head of the front bar rubber strip (wherein the front bar rubber strip connects the second and third front bars and mainly serves a waterproof function, here, the front bar rubber strip further connects to the front bar joint, enhancing the integrity between the front bar joint and the second front bar to form a continuous waterproof strip), the joint insertion area is configured to connect the rubber strip blade of the front bar rubber strip, the two engagements between the front rubber strip and the front point are equivalent to two waterproofing actions, which deliver better waterproofing performance, during installation, a lower portion of the T-shaped rubber strip insertion head is inserted into the C-shaped rubber-through rubber hole, the rubber strip blade is inserted into the joint insertion area; the profile-connecting protrusion is inserted into a second front bar insertion of the second front bar, forming a mating connection structure between the front bar joint and the second front bar, thereby improving connection stability. The gasket area is configured to mount a joint screw washer, and the edge of the gasket area is higher than a plane of the front bar joint, thus providing excellent waterproof performance. After installation of the joint screw washer, the gasket area will not feature any recessed structures and is less prone to water accumulation. The joint fixing hole is configured to connect joint screws. The joint reinforcing rib serves as a reinforcing structure of the front bar joint.

Further, the second outer frame comprises a spring groove, a connecting structure, a steel wire rope through-hole, a second abutting portion, a positioning screw, and a second base; the second base forms a bottom of the second outer frame, the second abutting portion cooperates with the C-shaped groove of the first front bar to limit the second outer frame on the first front bar; the positioning screw fixes the second outer frame to the C-shaped groove; the steel wire rope through-hole is configured for threading the steel wire rope and to provide support for the steel wire rope; the spring groove is configured to accommodate the spring, and the spring groove is connected to the second base through the connecting structure.

Further, the latch comprises a set screw hole, a latch head, and a steel wire rope hole, the set-screw hole is configured to connect the positioning screw, the latch head serves as a locking structure of the latch, the steel wire rope hole is configured to connect the steel wire rope. The lower side of the latch head features a beveled surface, while the upper side is flat, during locking, the beveled surface of the latch head is compressed by the side rail, causing it to retract, once the flat surface of the latch head passes over the side rail, the latch head extends and engages with the side rail through its flat surface, in actual operation, the lock limiting frame limits the movement of the lock head. The steel wire rope extends into the steel wire rope hole, and the steel wire rope is pressed and fixed within the steel wire rope hole by positioning screws, thereby connecting the steel wire rope to the latch. This connection structure is more convenient and eliminates a conventional steel wire rope clamping structure, in the prior art, steel wire ropes typically pass through the latch and are fixed at both ends of the latch by steel wire rope retainer, resulting in a relatively complex structure. This application not only optimizes the structure of the latch but also eliminates the need for steel wire rope retainer.

Further, the first outer frame comprises a latch screw hole, a positioning threaded hole, a latch hole, a first abutting portion, latch reinforcing ribs, and a first base; the first base forms the bottom of the first outer frame; the positioning threaded hole is configured to fix the first outer frame to the C-shaped groove; the latch screw hole is configured to tighten the positioning screw into the set-screw hole, since connection between the steel wire rope and the latch requires fixation by the positioning screw, the latch screw hole is provided on the first outer frame to facilitate tightening of the set screw. The first abutting portion is located within the C-shaped groove and limits the first outer frame within the C-shaped groove, the latch hole is configured to accommodate the latch and being a sliding hole for the latch tongue, the latch reinforcing ribs serve as reinforcing structures of the first outer frame.

Further, the rotating shaft system is provided with a rotating rod locking groove, the first front bar is provided with a C-shaped groove, the rear bar is provided with a rear bar groove; the latch system is connected to the C-shaped groove, the rotating rod locking groove, and the rear bar groove.

Further, the vehicle cover comprises a front bar anti-detachment system, the front bar anti-detachment system comprises an anti-detachment handle, an anti-detachment webbing, and a buckle; the guide rail system comprises guide rails, the guide rails are connected with guide rail clamps, the guide rail clamps are provided with webbing fixing holes, the buckle is connected to the webbing fixing holes, the anti-detachment handle is connected to the first bottom portion of the second front bar, one end of the anti-detachment webbing is connected to the anti-detachment handle, while another end thereof is connected to the buckle, wherein the anti-detachment webbing is made of a flexible material.

Further, the support system comprises an upper base, a lower base, a first nut, a second nut, a fork nut, a fully threaded bolt, a threaded portion, and a knurled nut; the upper base is provided with screw fixing holes and is connected to the third front bar through the screw fixing holes; the lower base is provided with a fixing slider, the fixing slider extends into the C-shaped groove of the first front bar and being fixed to the second front bar by screws; the lower base and the upper base are connected by the fork nut and the fully threaded bolt, a threaded portion of the fork nut extends into a circular hole of the upper base, the fork nut slides along the circular hole, the fork nut is sleeved with the knurled nut, the knurled nut is in threaded engagement with the threaded portion, the fork nut and the knurled nut are arranged within a first mounting area and a second mounting area, wherein the second mounting area is larger than the first mounting area, the knurled nut abuts against a nut abutting surface of the upper base, thereby forming a triangular structure. The outer wall of the knurled nut is a knurled outer wall, which is convenient for manual rotation and adjustment, while the inner wall of the knurled nut is a threaded inner wall, which is threaded to the threaded portion and can be locked by the thread.

Further, the fork nut comprises a threaded portion, a C-shaped head, an intermediate cylinder, a connection hole, and a retaining ring; the fully threaded bolt is provided with a threaded portion and a bolt hole; the threaded bolt hole passes through the intermediate cylinder, the intermediate cylinder is fixed to the C-shaped head; the connection hole is provided on the intermediate cylinder, the retaining ring passes through the connection hole and locks the intermediate cylinder to the C-shaped head.

The beneficial effects of the present invention:

1. By modifying the connection manner of the vehicle cover, this application enables easier installation of the vehicle cover, allowing the entire process can be completed by a single person.
2. By modifying the support system of the vehicle cover, the present application enables the vehicle cover to be opened to multiple angles, allowing adjustment according to actual needs.

Figure 1:
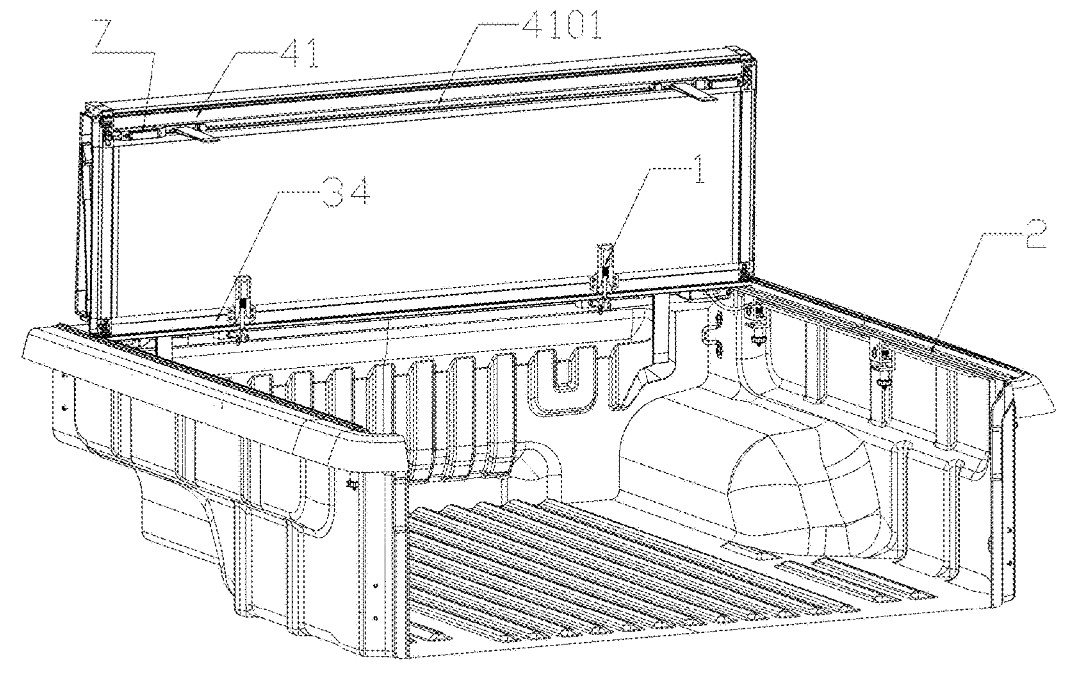
FIG. 1 is a schematic view of the vehicle cover in an open state according to the present invention.
Figure 2:
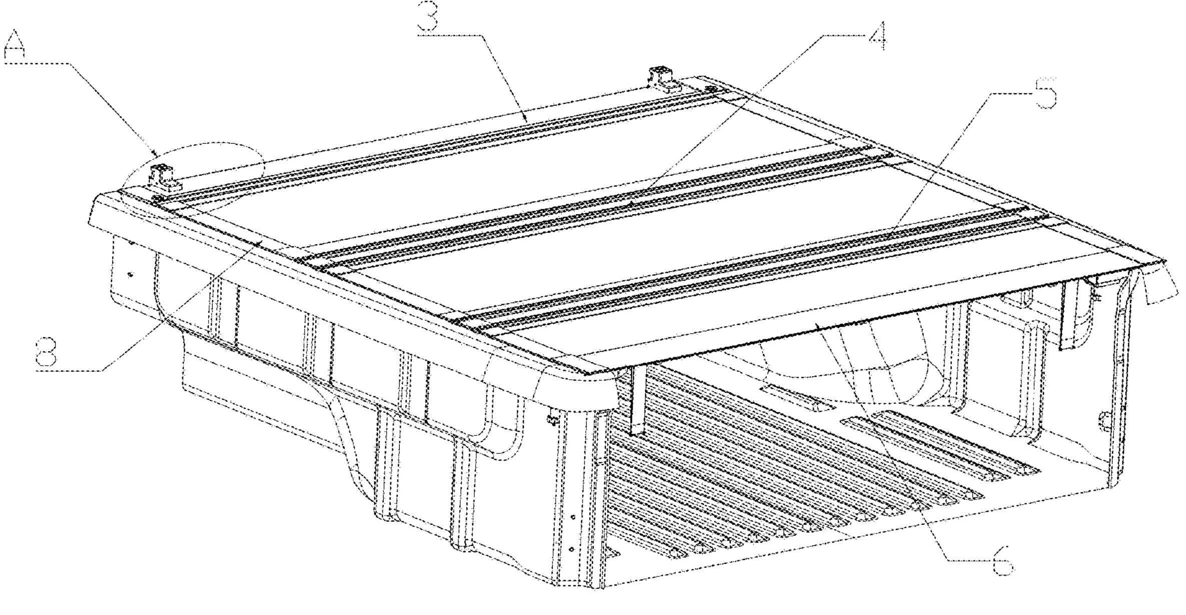
FIG. 2 is a schematic view of the vehicle cover in a closed state according to the present invention.
Figure 3:
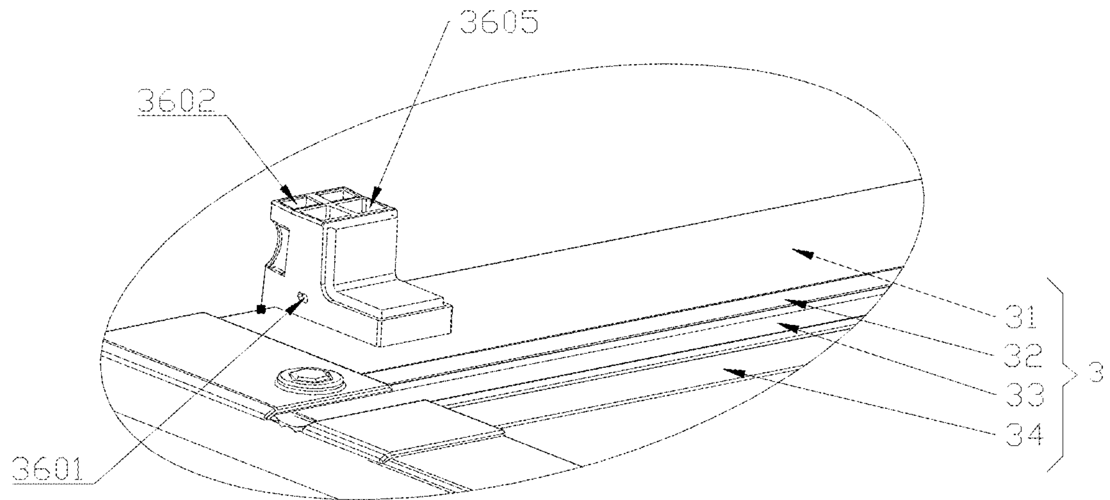
FIG. 3 is a partially enlarged view of part A in FIG. 2.
Figure 4:
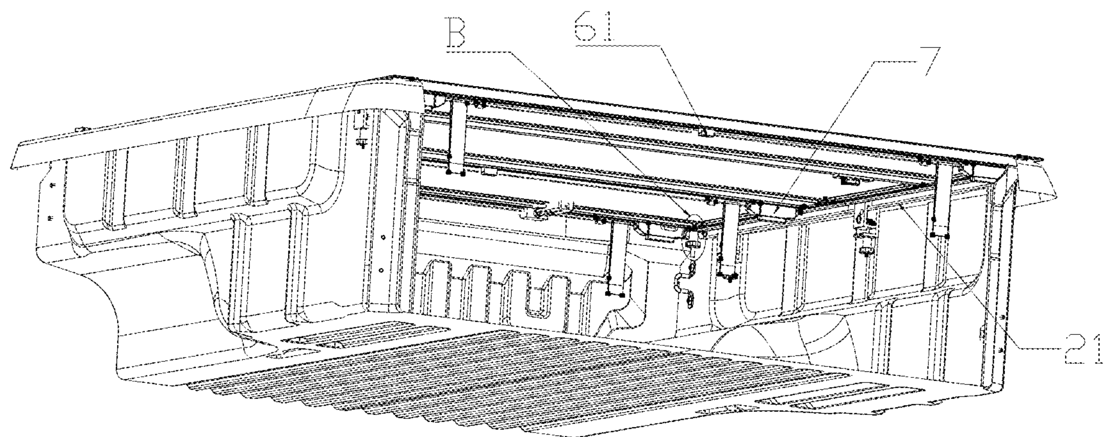
FIG. 4 is a schematic view of a connection structure of the present invention.
Figure 5:
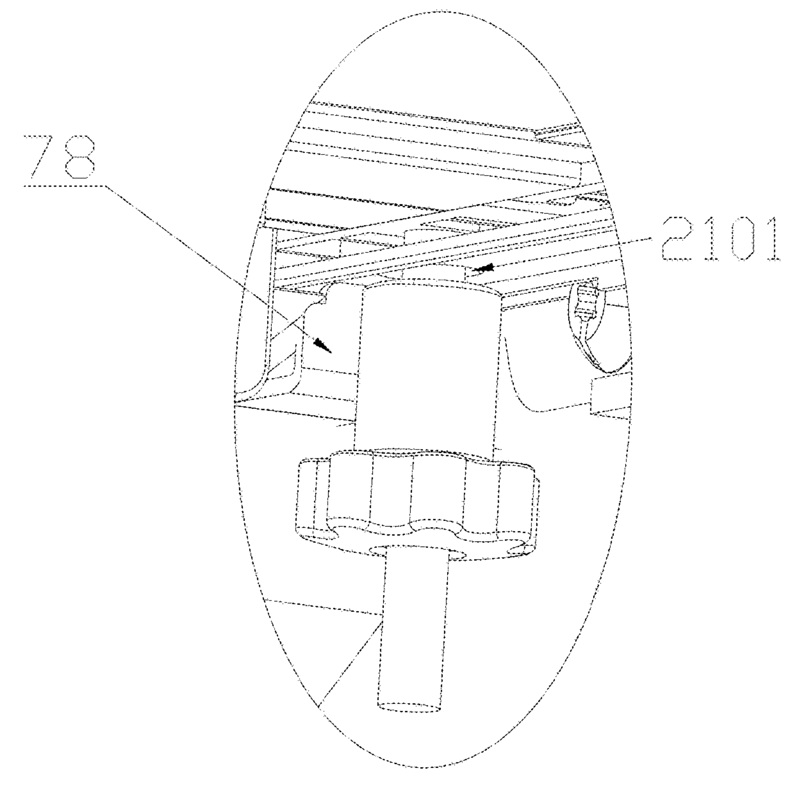
FIG. 5 is a partially enlarged view of part B in FIG. 4.
Figure 6:
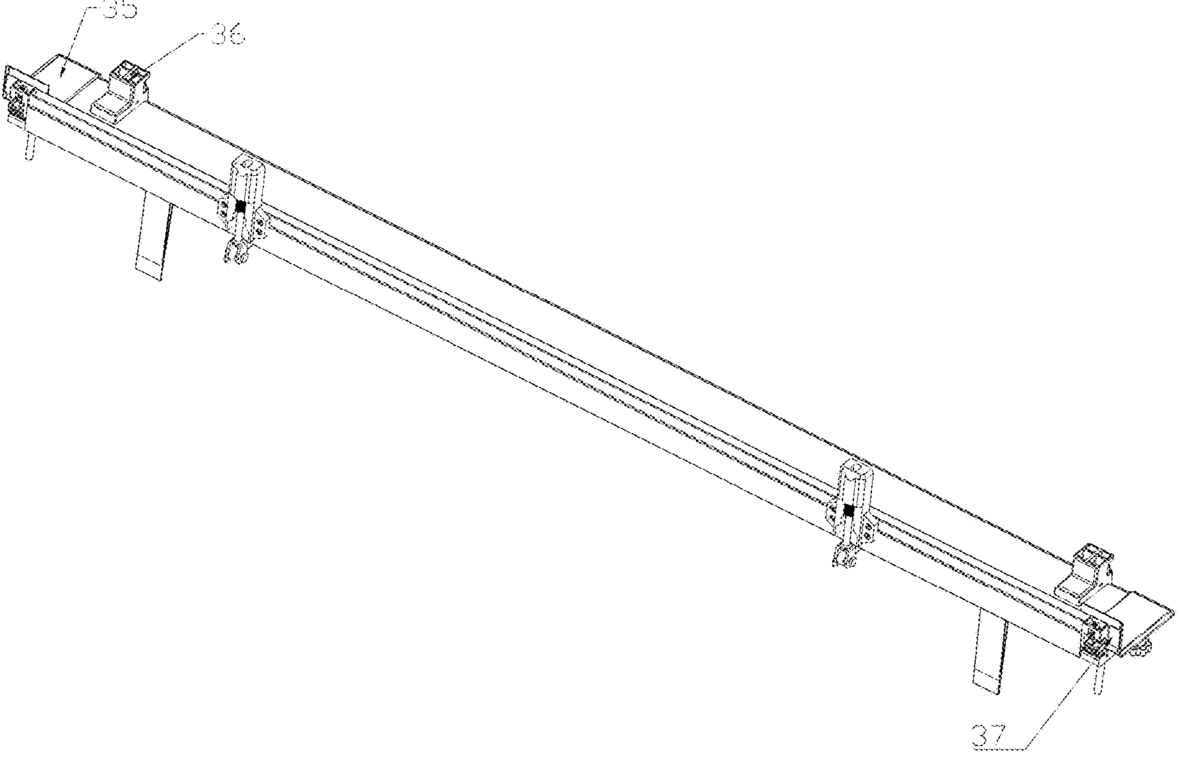
FIG. 6 is a structural schematic view of a front bar system of the present invention.
Figures 7, 8:
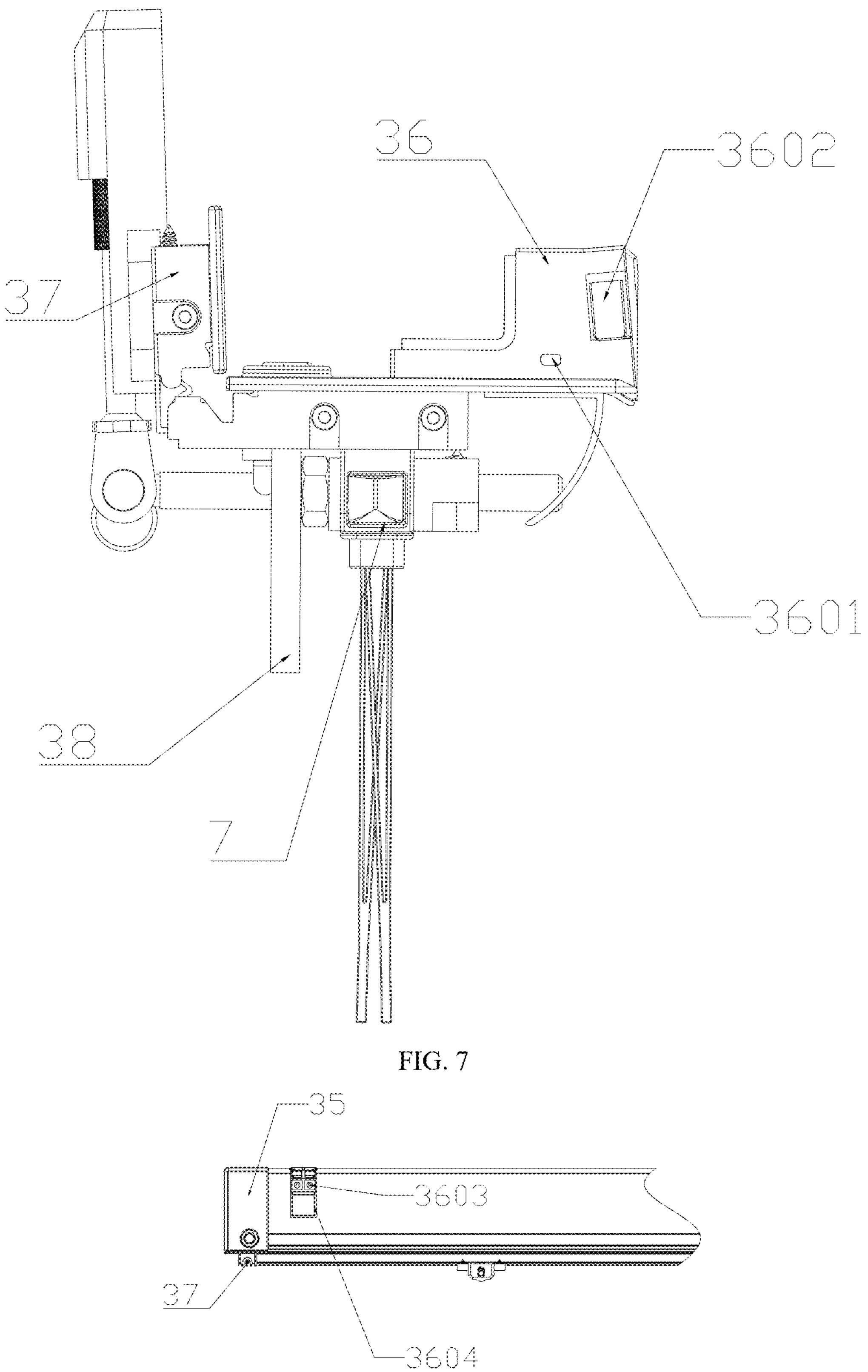
FIG. 7 is a first side view of the front bar system of the present invention.
FIG. 8 is a first partial schematic view of the front bar system of the present invention.
Figure 9:
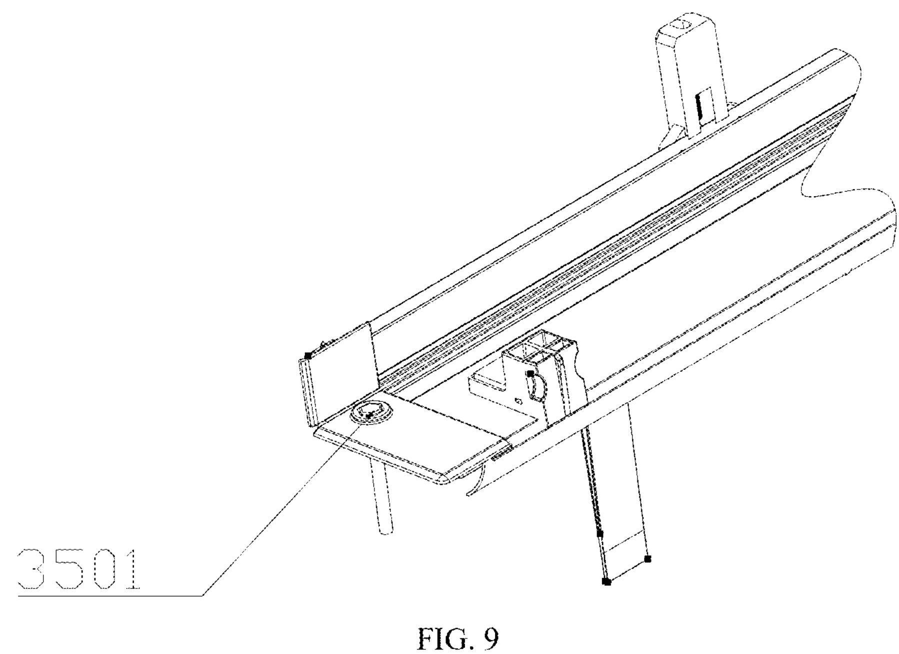
FIG. 9 is a second partial schematic view of the front bar system of the present invention.
Figure 10:
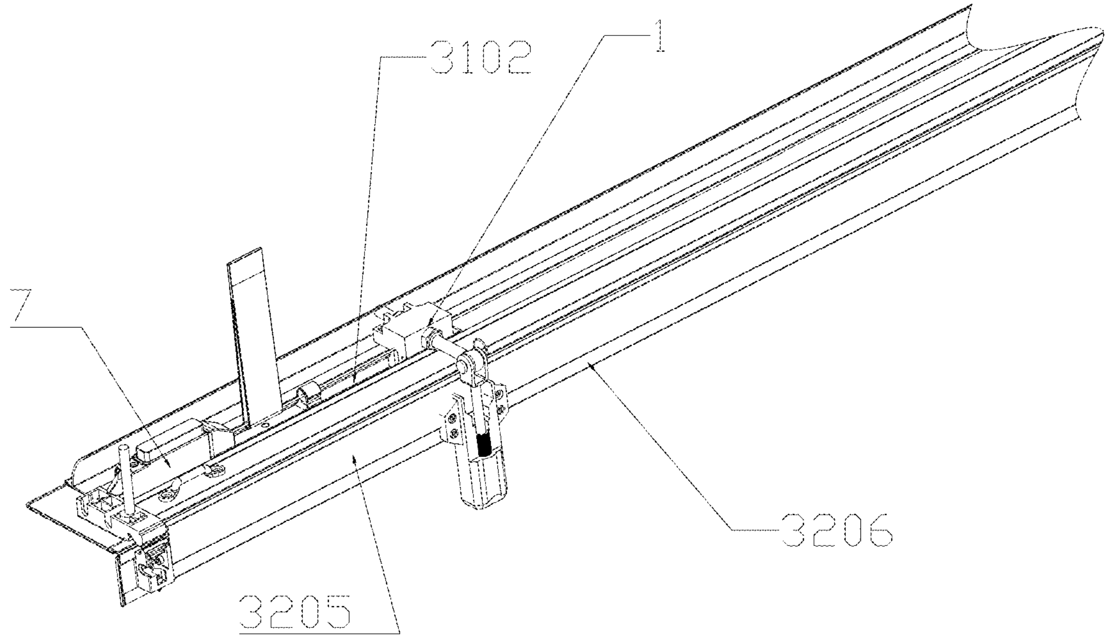
FIG. 10 is a schematic view of a connection between a latch system and the front bar system of the present invention.
Figure 11:
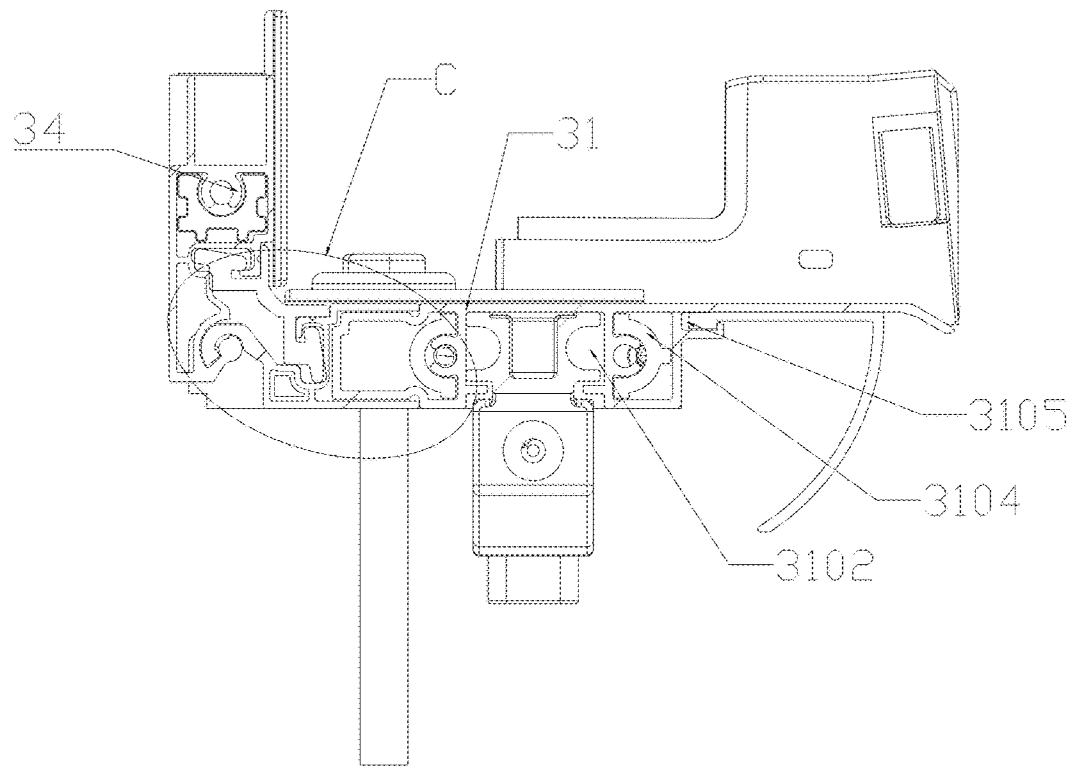
FIG. 11 is a second side view of the front bar system of the present invention.
Figure 12:
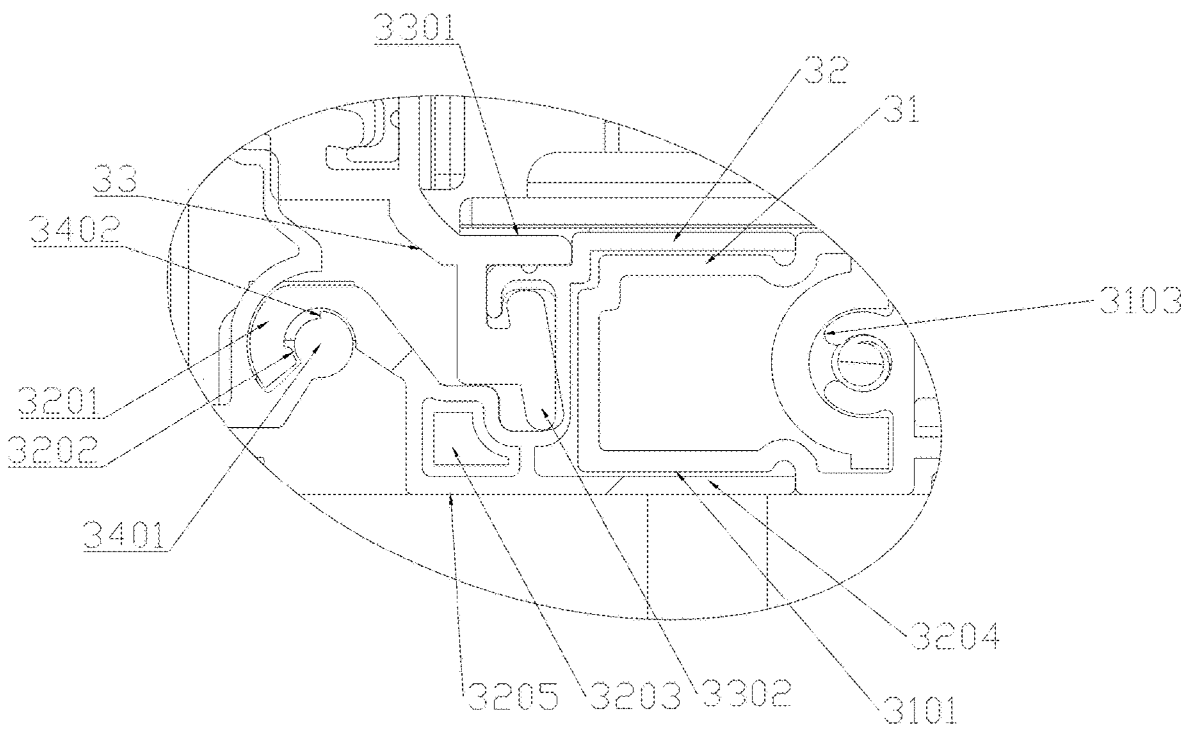
FIG. 12 is a partially enlarged view of part C in FIG. 11.
Figure 13:
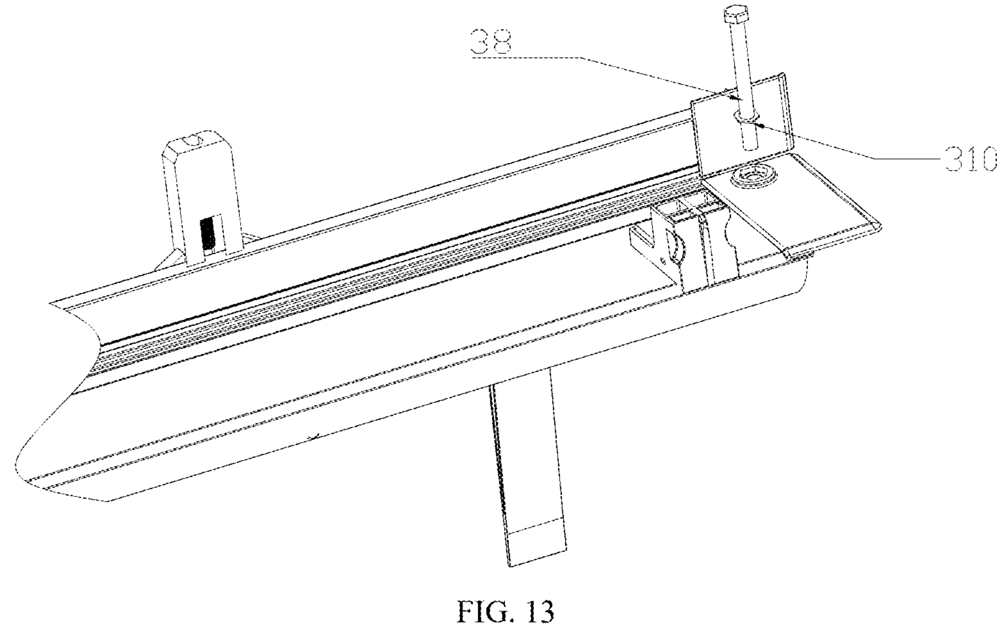
FIG. 13 is a third partial schematic view of the front bar system of the present invention.
Figure 14:
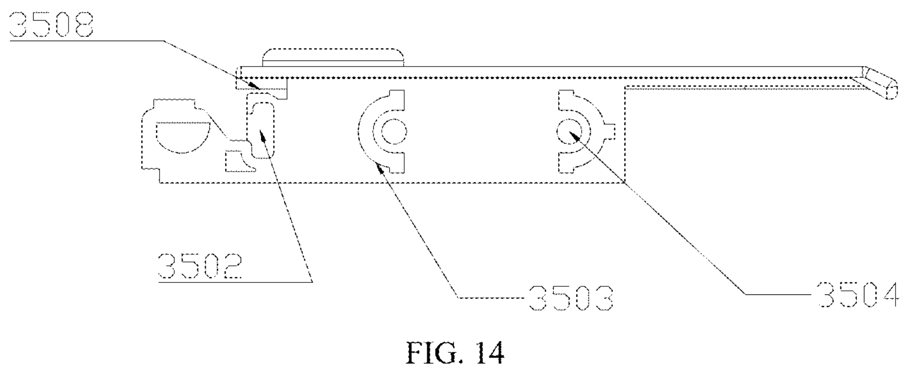
FIG. 14 is a first structural schematic view of a front bar joint.
Figure 15:
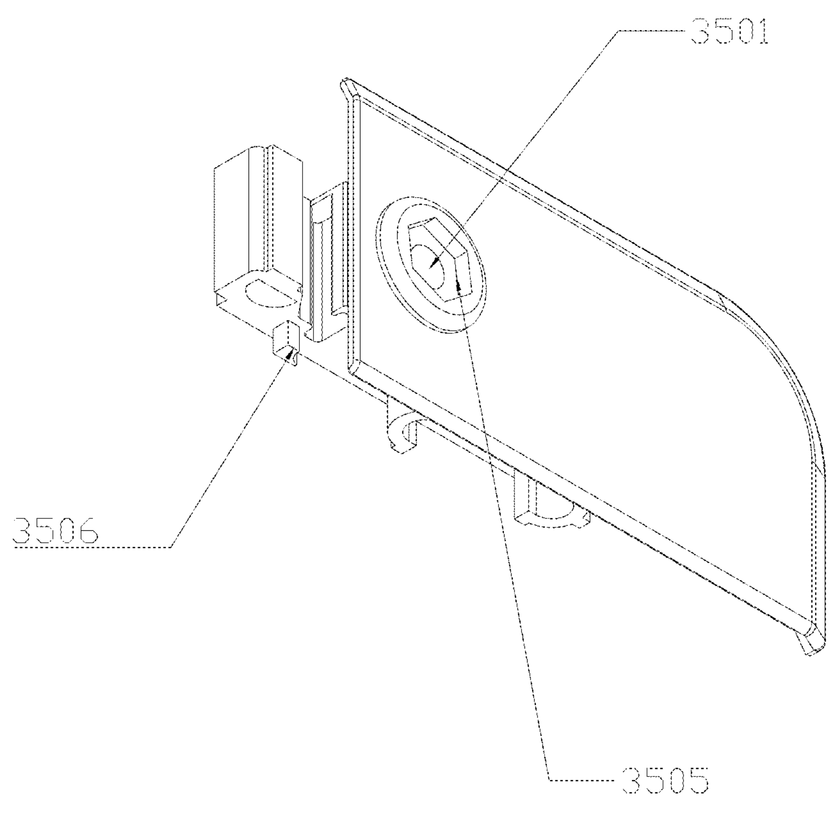
FIG. 15 is a second structural schematic view of the front bar joint.
Figure 16:
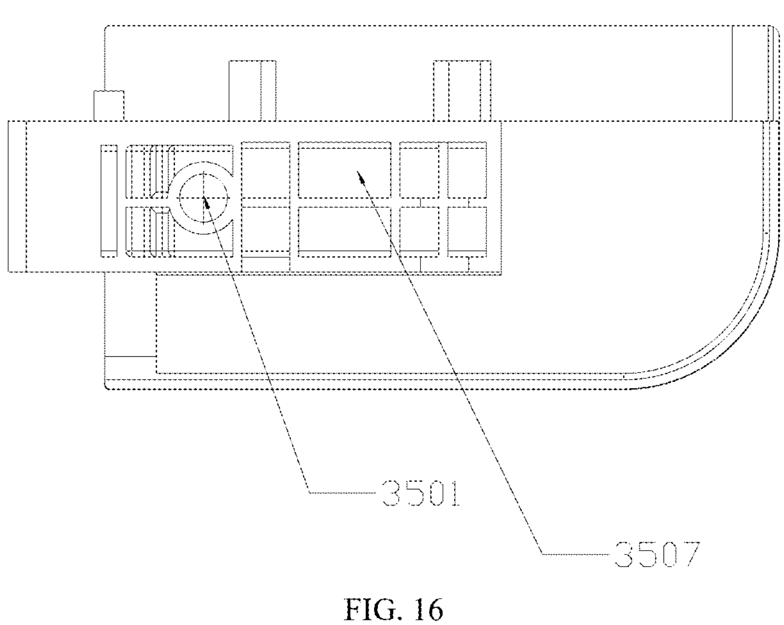
FIG. 16 is a third structural schematic view of the front bar joint.
Figure 17:
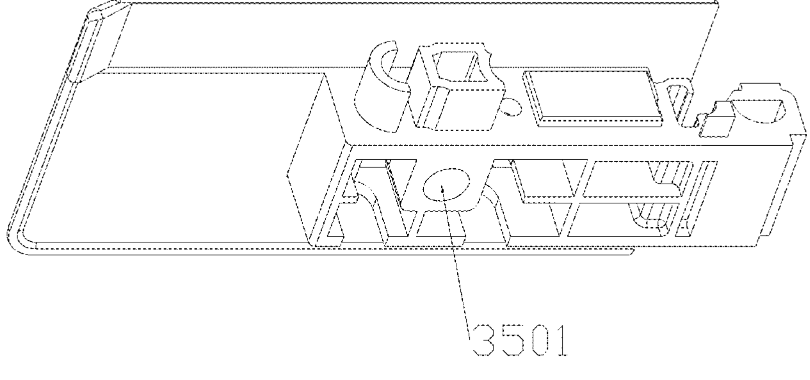
FIG. 17 is a fourth structural schematic view of the front bar joint.
Figure 18:
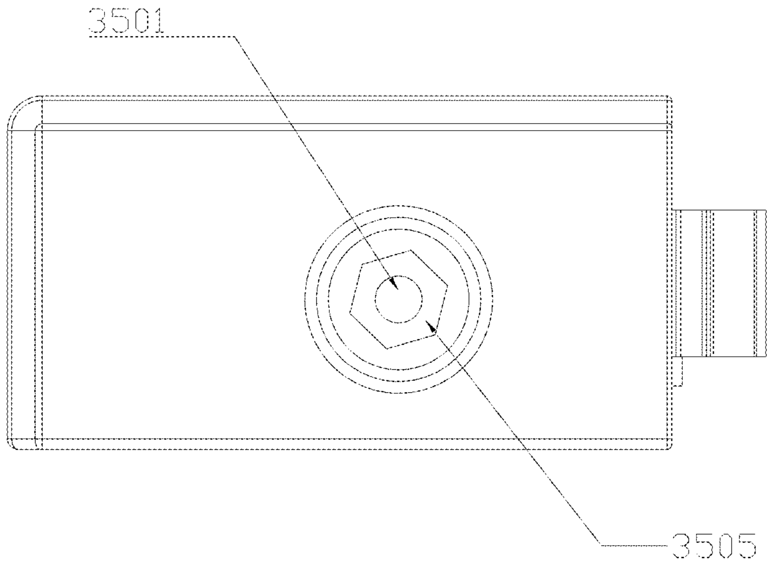
FIG. 18 is a fifth structural schematic view of the front bar joint.
Figure 19:
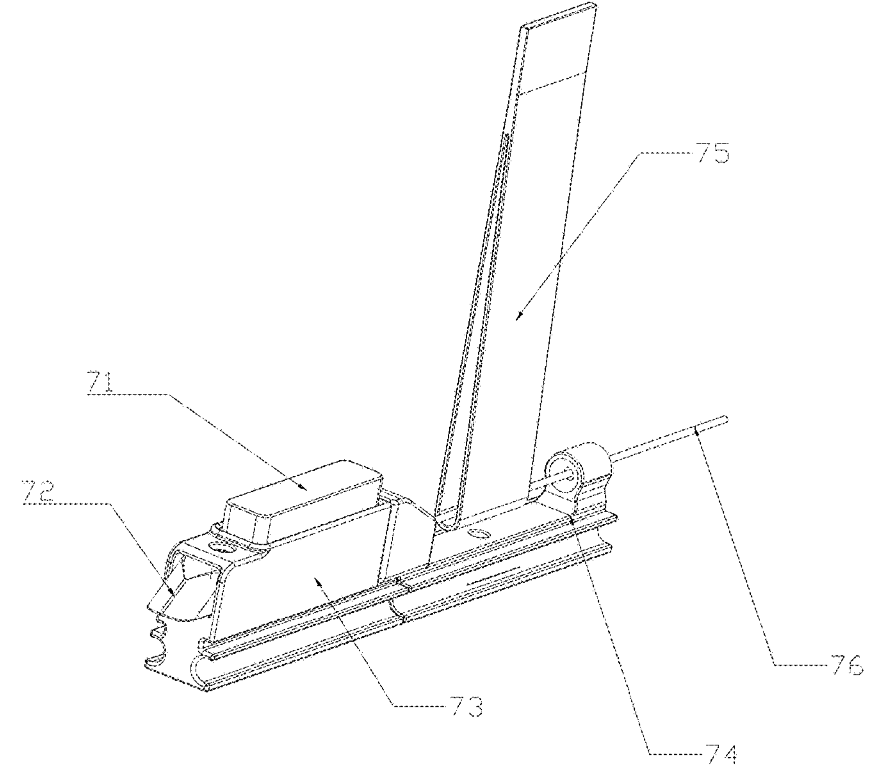
FIG. 19 is a structural schematic view of the latch system.
Figure 20:
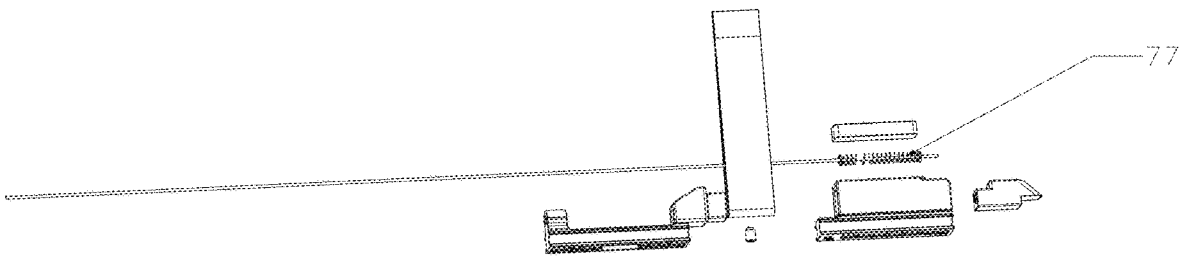
FIG. 20 is an exploded view of the latch system.
Figure 21:
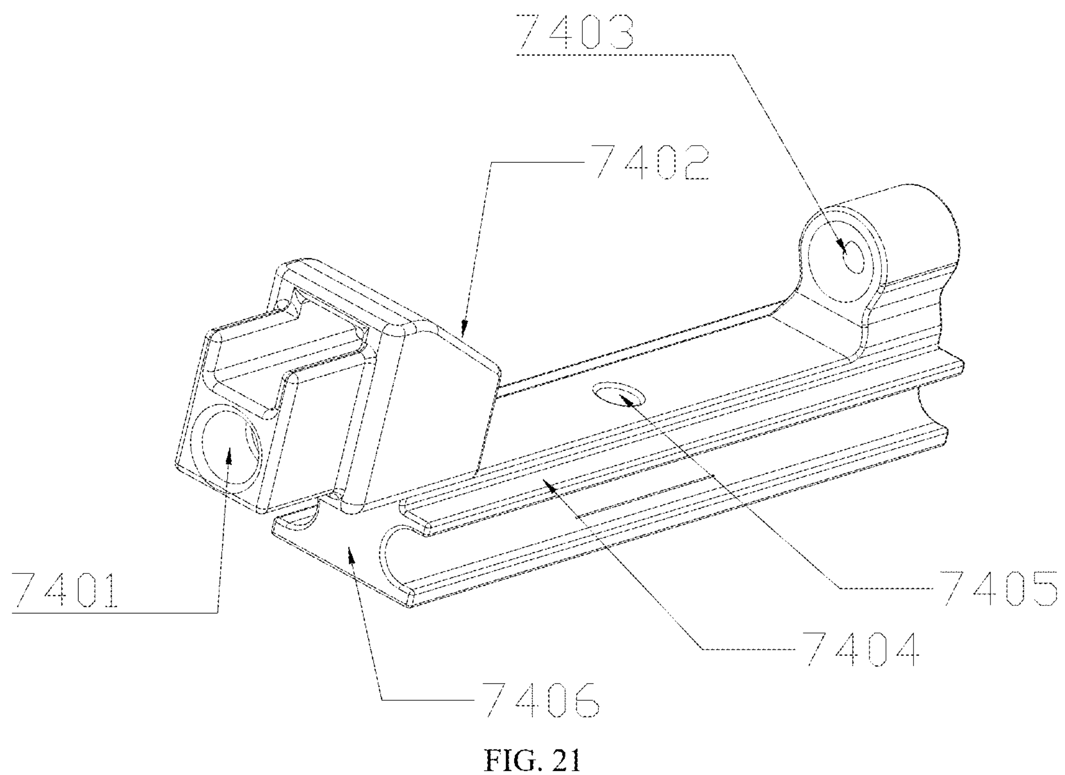
FIG. 21 is a structural schematic view of a second outer frame.
Figure 22:
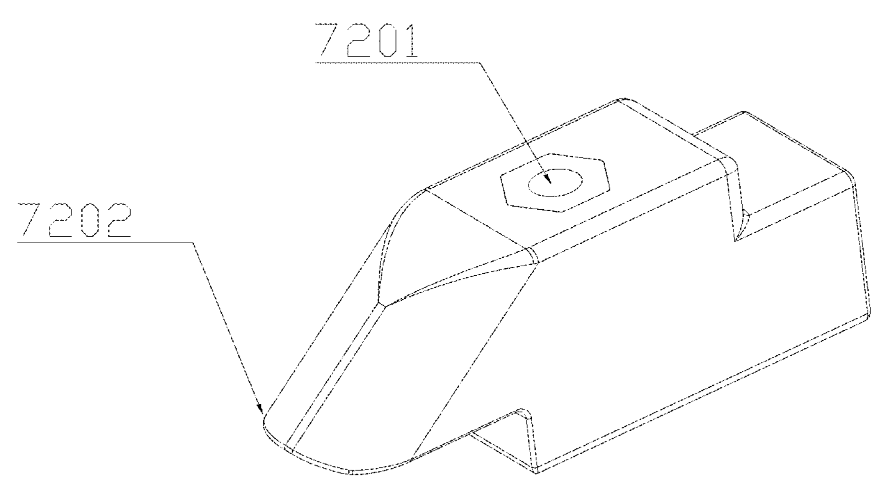
FIG. 22 is a first structural schematic view of a latch head.
Figure 23:
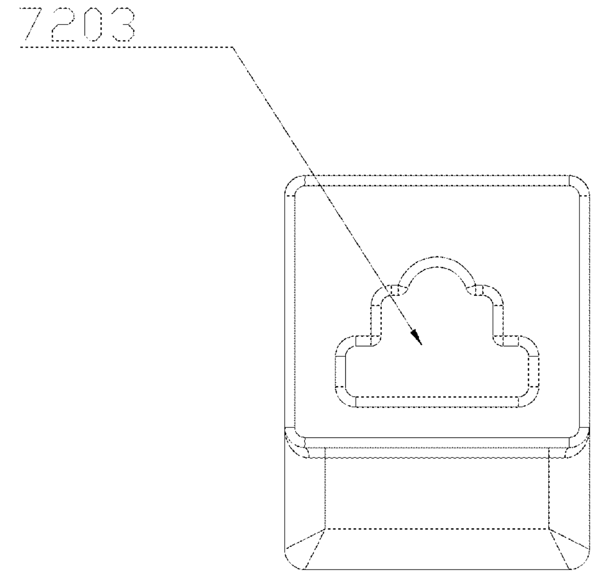
FIG. 23 is a second structural schematic view of the latch head.
Figure 24:
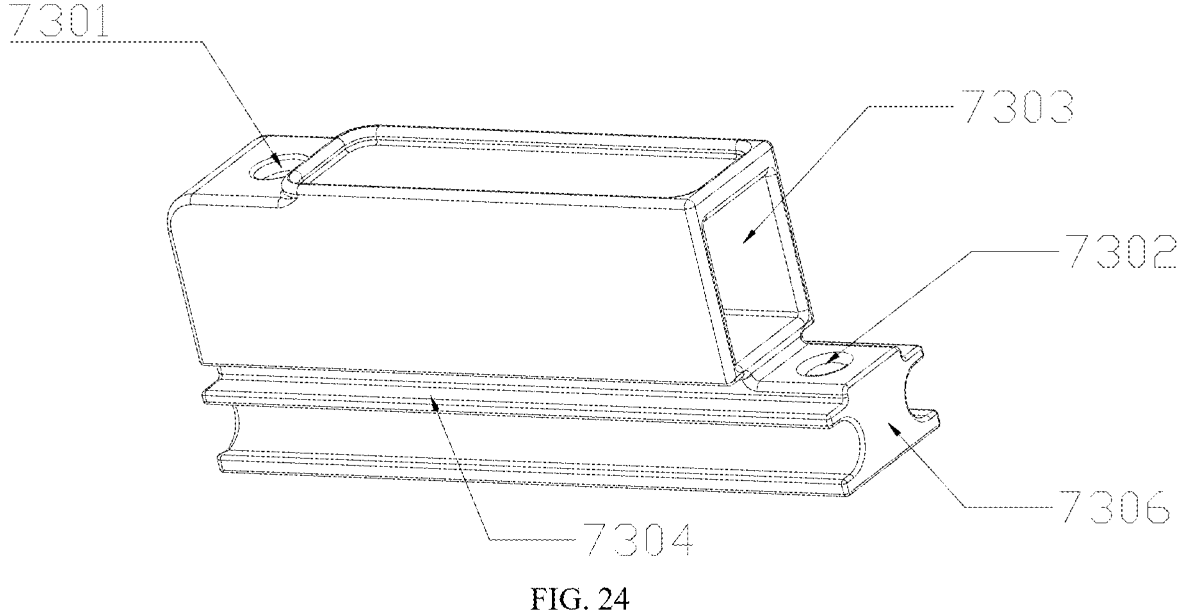
FIG. 24 is a first structural schematic view of a first outer frame.
Figure 25:
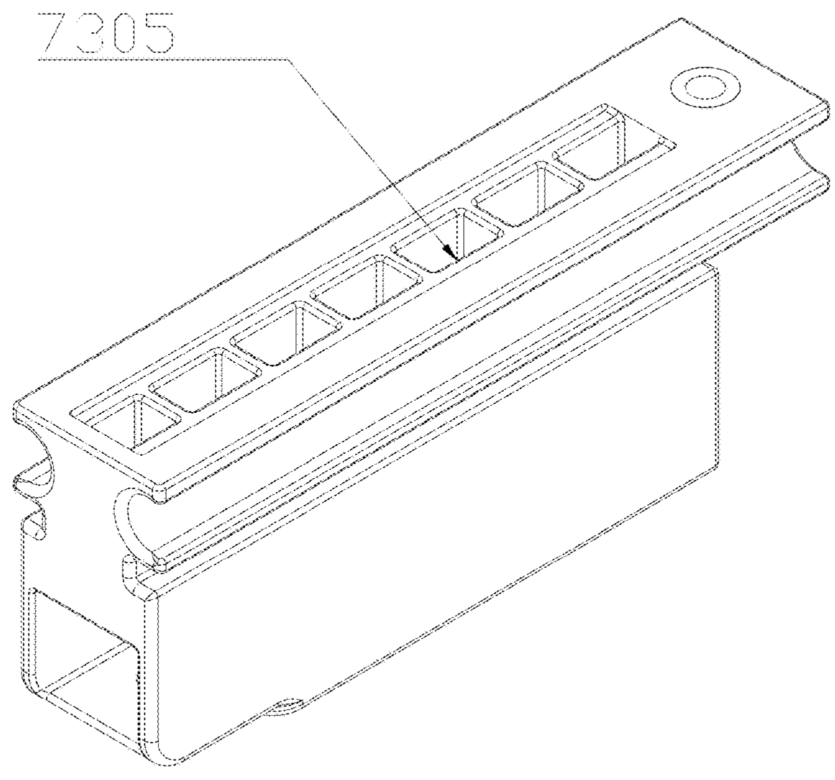
FIG. 25 is a second structural schematic view of the first outer frame.
Figure 26:
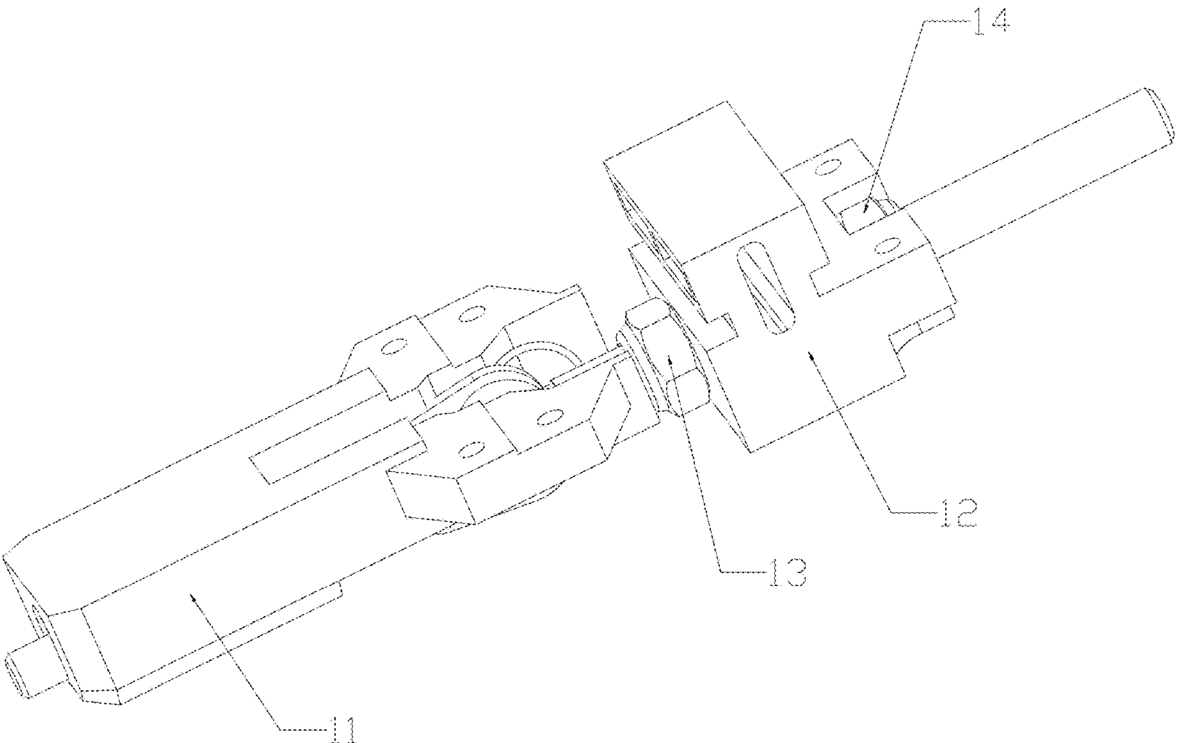
FIG. 26 is a first structural schematic view of a support system.
Figure 27:
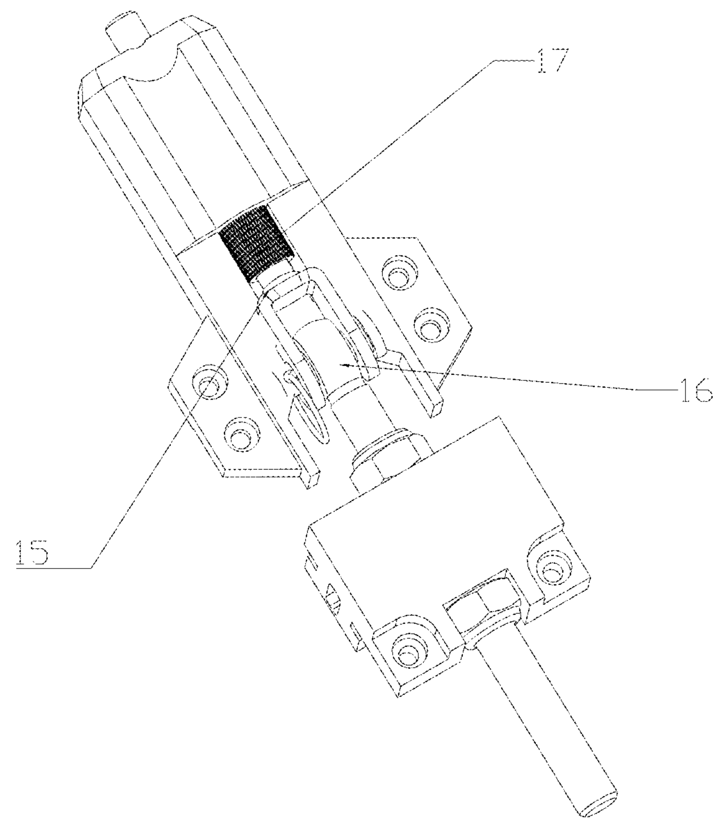
FIG. 27 is a second structural schematic view of the support system.
Figure 28:
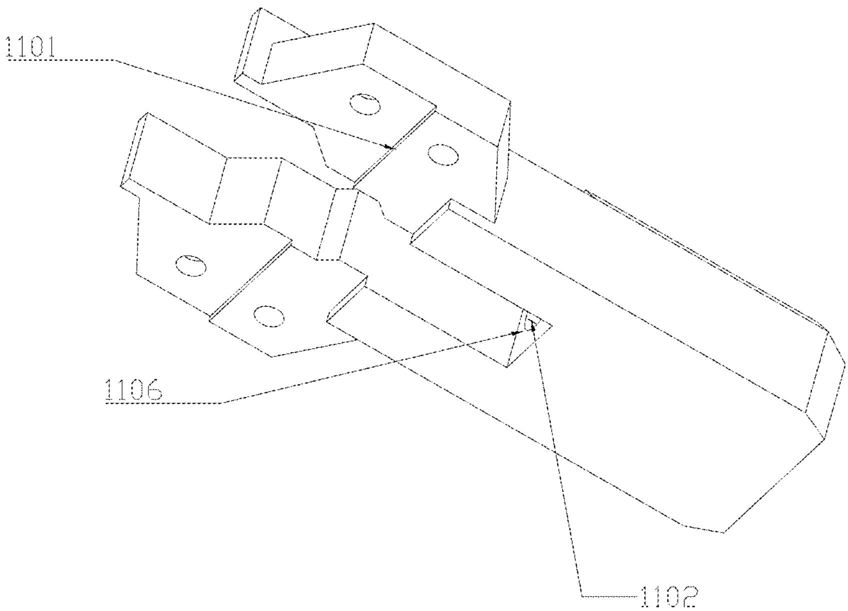
FIG. 28 is a first structural schematic view of an upper base.
Figure 29:
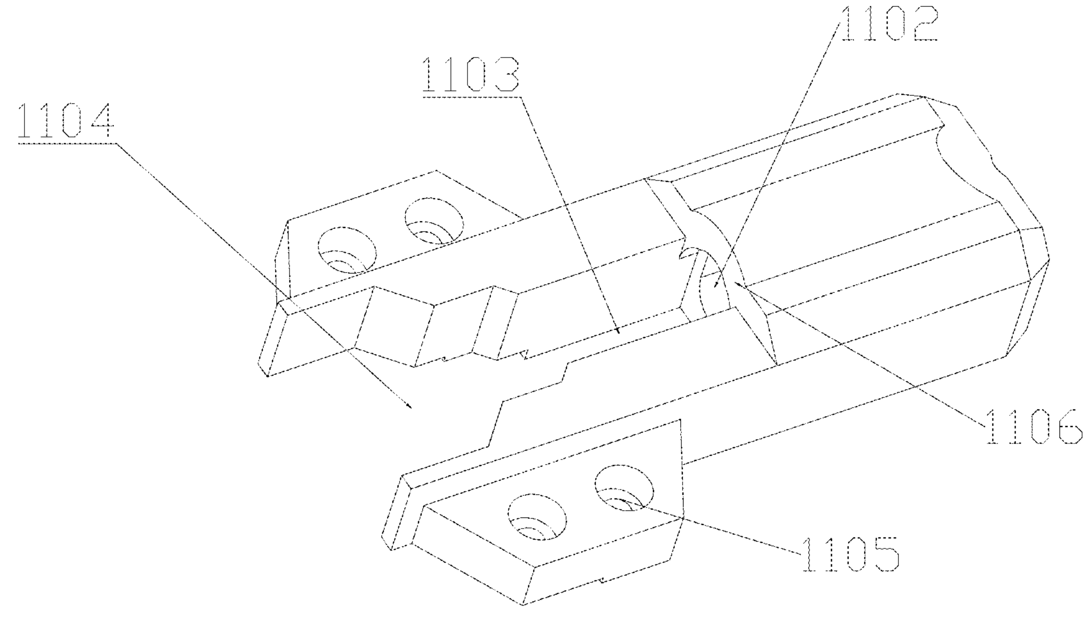
FIG. 29 is a second structural schematic view of the upper base.
Figure 30:
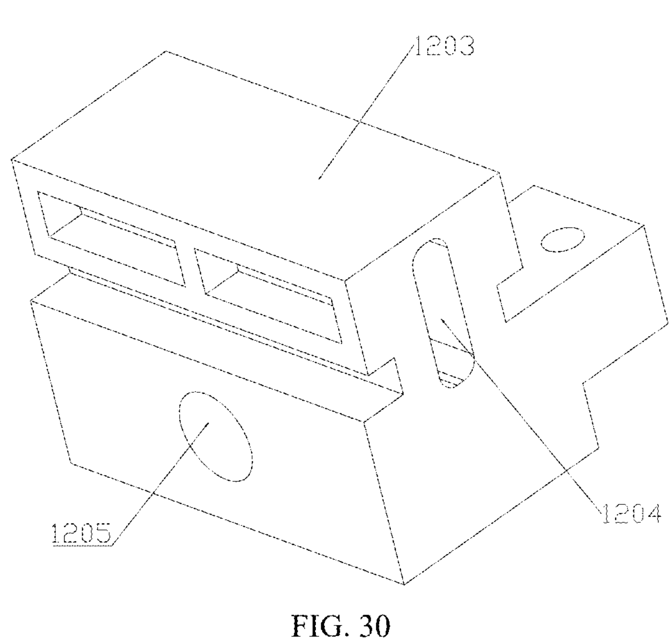
FIG. 30 is a first structural schematic view of a lower base.
Figure 31:
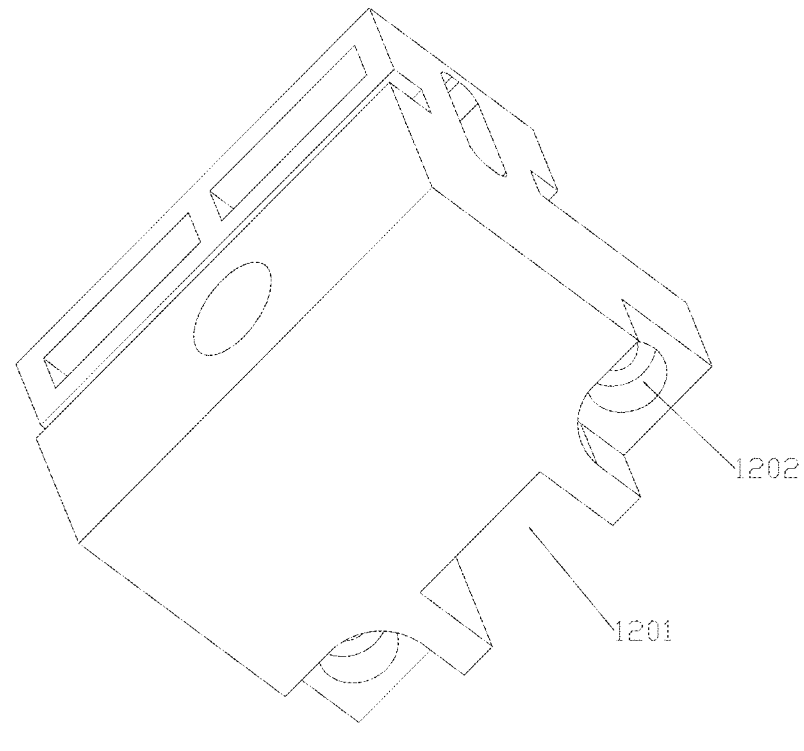
FIG. 31 is a second structural schematic view of the lower base.
Figure 32:
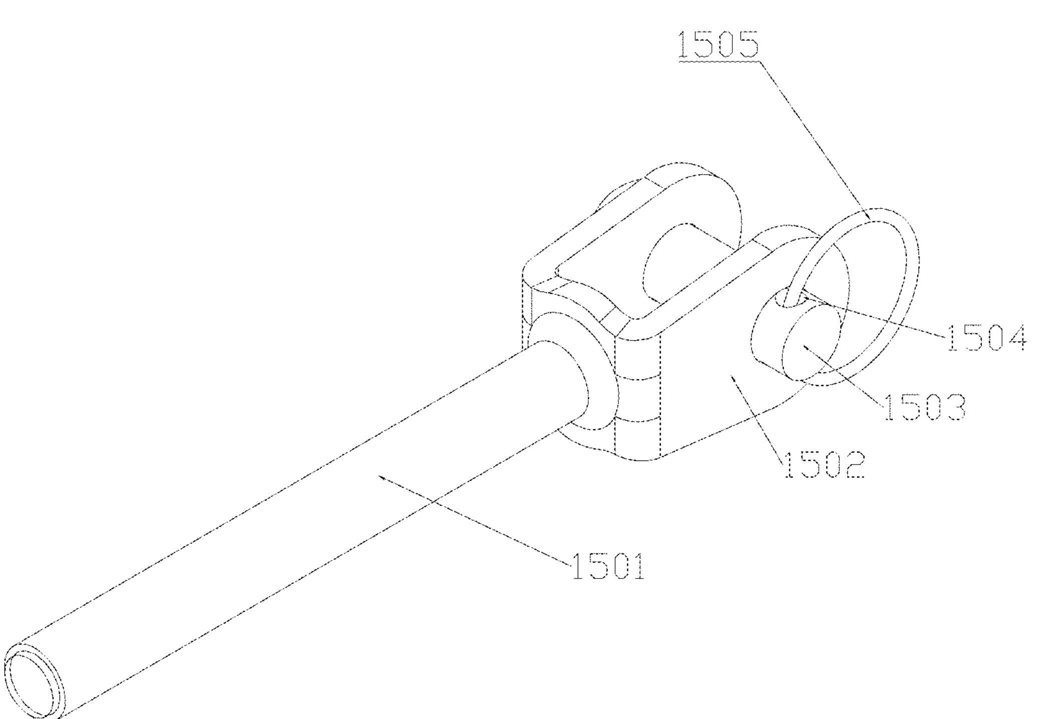
FIG. 32 is a structural schematic view of a fork nut.
Figure 33:
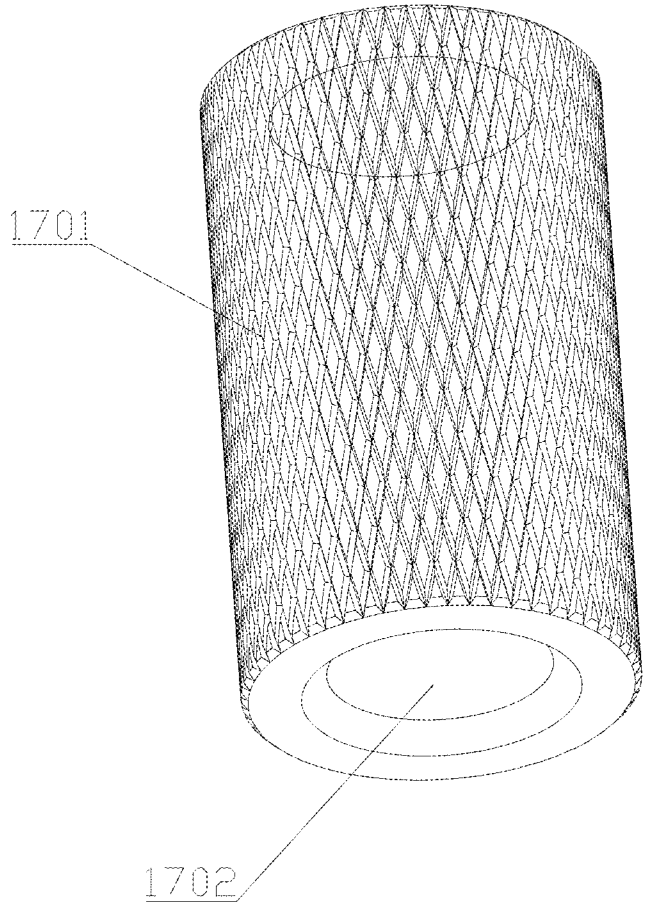
FIG. 33 is a structural schematic view of a knurled nut.
Figure 34:
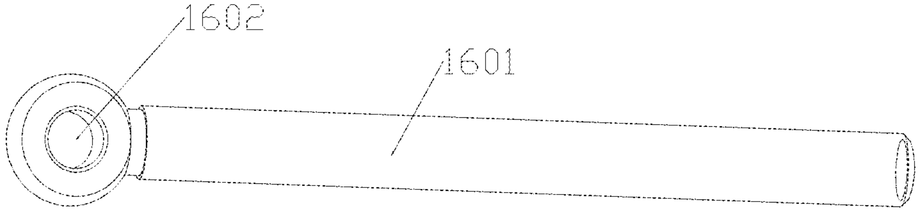
FIG. 34 is a structural schematic view of a fully threaded bolt.
Figure 35:
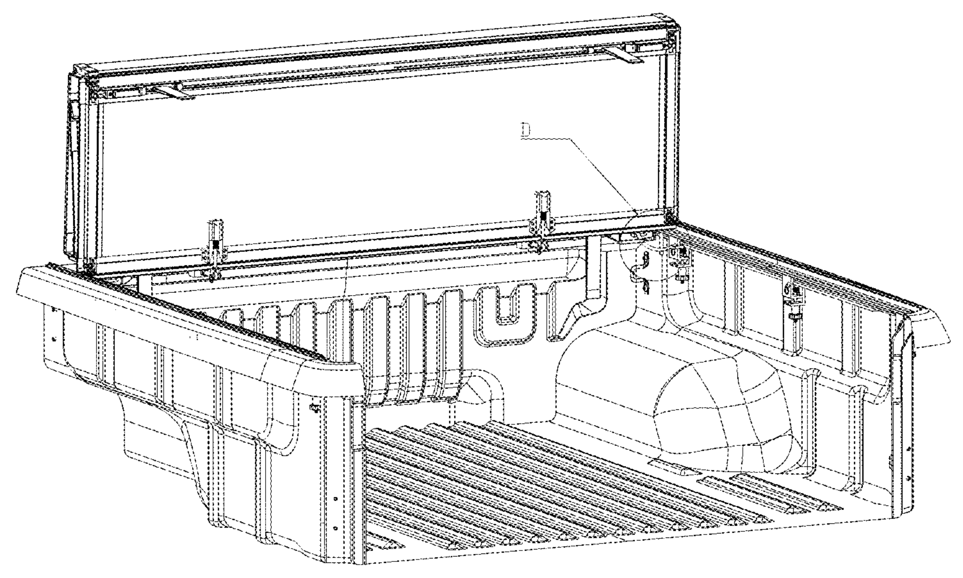
FIG. 35 is an installation schematic view of the present invention.
Figure 36:
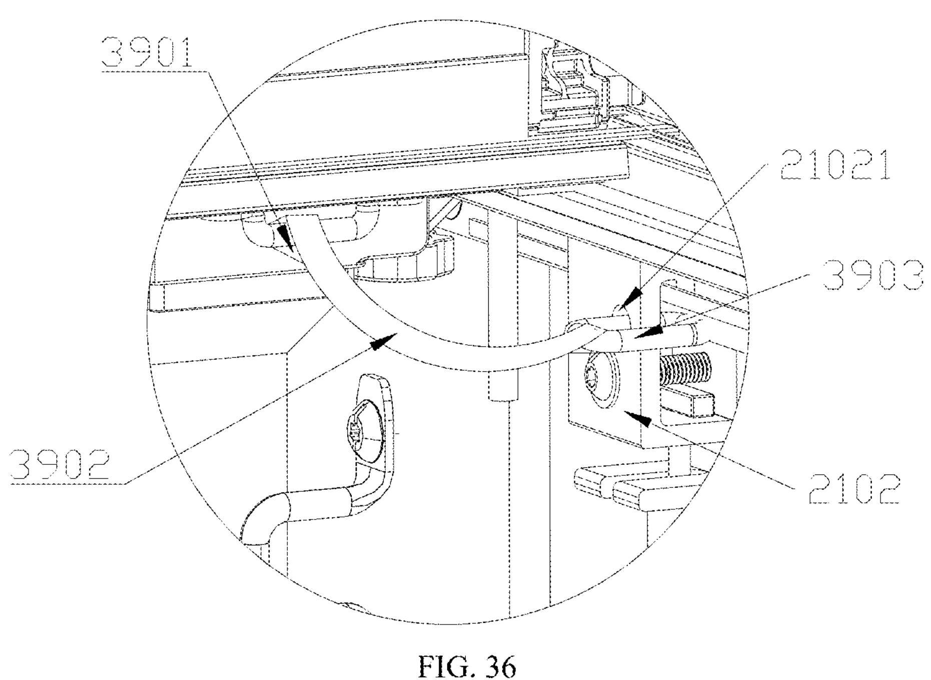
FIG. 36 is a partially enlarged view of part D in FIG. 35.
Figure 37:
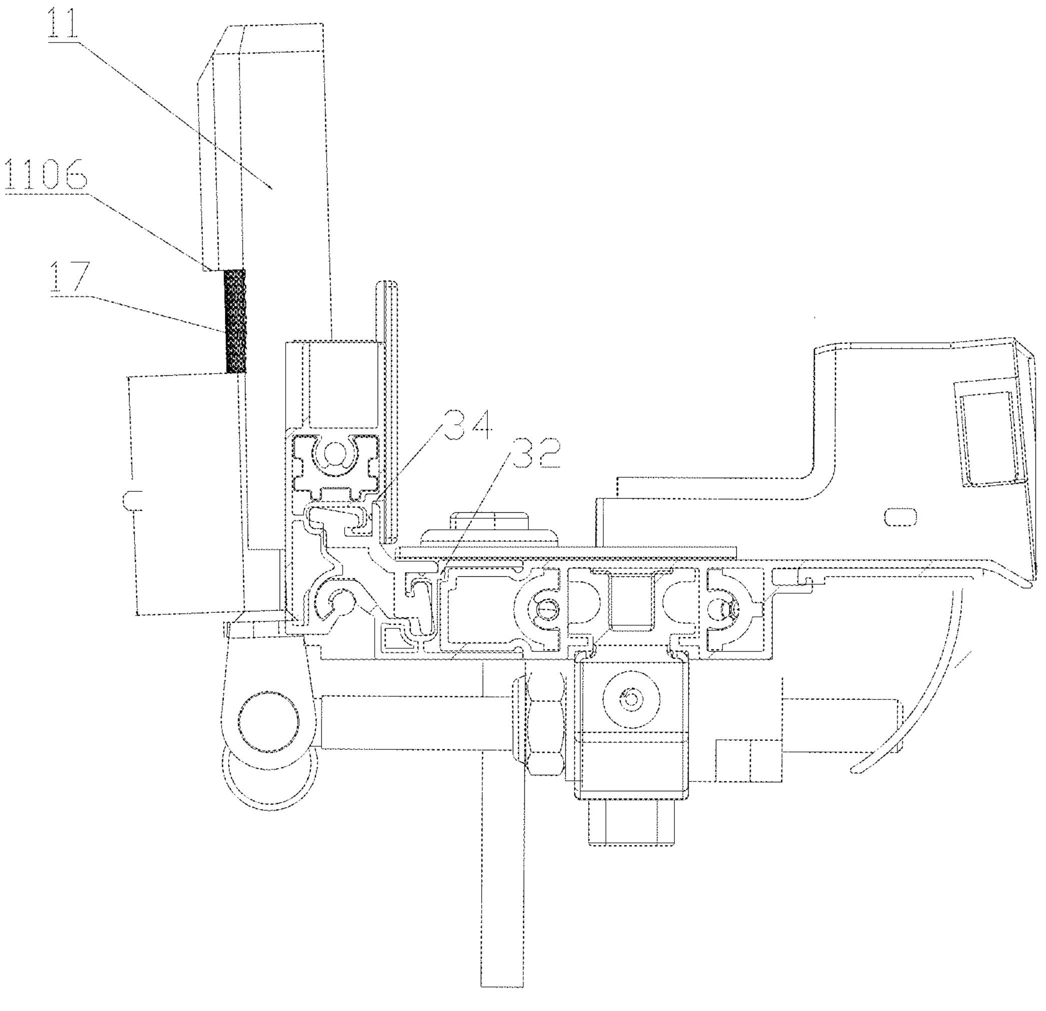
FIG. 37 is a structural schematic view showing the support system at a right angle.
Figure 38:
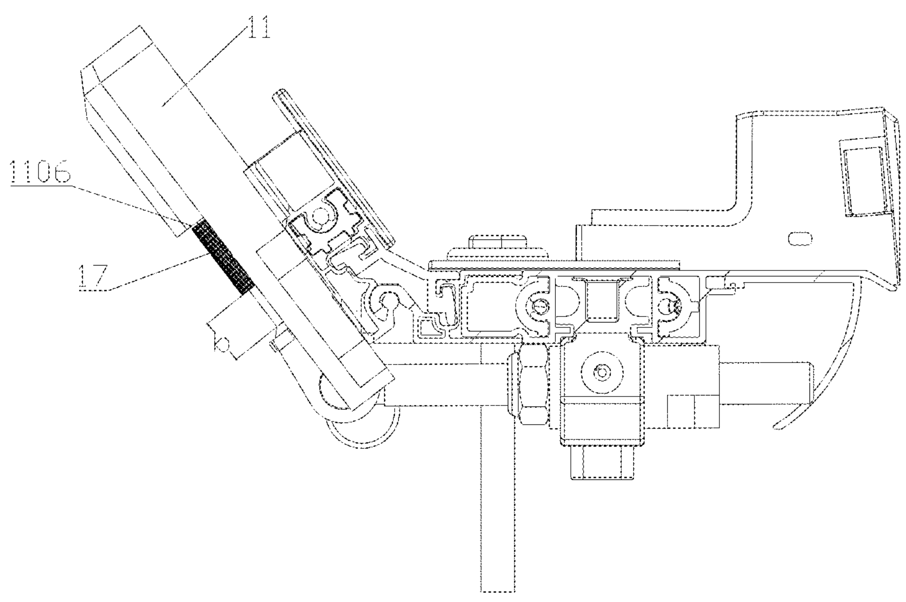
FIG. 38 is a structural schematic view showing the support system at an obtuse angle.
Figure 39:
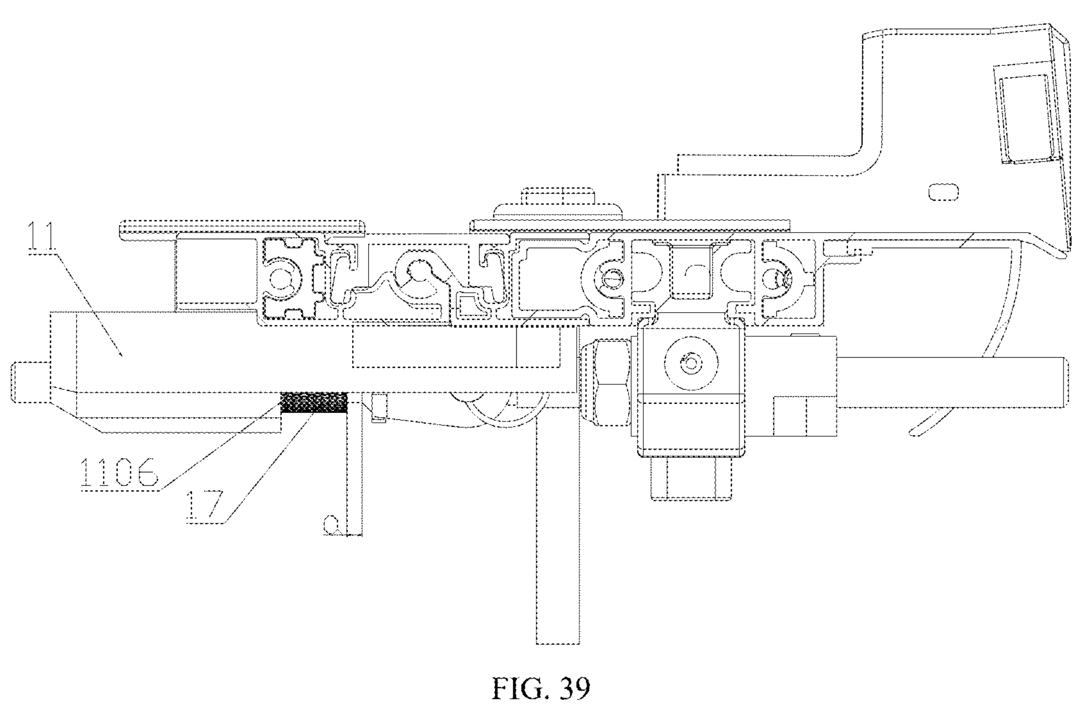
FIG. 39 is a structural schematic view showing the support system in a horizontal state.

1. Support system; 11. Upper base; 1101. Upper base step; 1102. Circular hole; 1103. First mounting area; 1104. Second mounting area; 1105. Screw fixing hole; 1106. Nut abutting surface; 12. Lower base; 1201. Mounting space; 1202. Base fixing hole; 1203. Fixing slider; 1204. Lower base steel wire hole; 1205. Lower base circular hole; 13. First nut; 14. Second nut; 15. Fork nut; 1501. Threaded portion; 1502. C-shaped head; 1503. Intermediate cylinder; 1504. connection hole; 1505. Retaining ring; 16. Fully threaded bolt; 1601. Threaded portion; 1602. Threaded bolt hole; 17. Knurled nut; 1701. Knurled outer wall; 1702. Threaded inner wall;

2. Guide rail system; 21. Guide rail; 2101. Elongated guide rail hole; 2102. Guide rail clamp; 21021. Webbing fixing hole;
3. Front bar system; 31. First front bar; 3101. First front bar adhesive surface; 3102. C-shaped groove; 3103. First connection port; 3104. Second connection port; 3105. First rubber strip insertion opening; 32. Second front bar; 3201. Second front bar circular hook; 3202. Protruding blocking head; 3203. Second front bar insertion; 3204. Second front bar adhesive surface; 3205. First bottom portion; 3206. Second bottom portion; 33. Front bar rubber strip; 3301. Rubber strip blade; 3302. Rubber strip T-shaped insertion head; 34. Third front bar; 3401. Third front bar rotating shaft; 3402. Stepped protrusion; 35. Front bar joint; 3501. Joint fixing hole; 3502. C-shaped rubber-through joint hole; 3503. Joint insertion head; 3504. Joint screw hole; 3505. Gasket area; 3506. Profile connection protrusion; 3507. Joint reinforcing rib; 3508. Joint insertion area; 36. Front bar buckle head; 3601. Drainage outlet; 3602. Insertion opening; 3603. Fixing threaded hole; 3604. Buckle head groove; 3605. Support groove; 37. Front bar rotating shaft joint; 38. Joint screw; 39. Front bar anti-detachment system; 3901. Anti-detachment handle; 3902. Anti-detachment webbing; 3903. Buckle; 310. Joint screw gasket;
4. First rotating shaft; 41. Rotating rod; 4101. Rotating rod locking groove; 5. Second rotating shaft; 6. Rear bar; 61. Rear bar groove;
7. Latch system; 71. Gasket; 72. Latch; 7201. Set screw hole; 7202. Latch head; 7203. Steel wire hole; 73. First outer frame; 7301. Latch screw hole; 7302. Positioning threaded hole; 7303. Latch hole; 7304. First abutting portion; 7305. Latch reinforcing rib; 7306. First base; 74. Second outer frame; 7401. Spring groove; 7402. Connecting structure; 7403. Steel wire through hole; 7404. Second abutting portion; 7405. Positioning screw; 7406. Second base; 75. Handle webbing; 76. Steel wire rope; 77. Spring; 78. Limiting frame; 8. ide rail.

DETAILED DESCRIPTION OF THE INVENTION

The following instruction further explains the invention's concrete implementation method.

In order to enable a clearer understanding of the above-mentioned objects, features and advantages of the present invention, the present invention will be described in detail below in connection with the accompanying drawings and specific embodiments. It should be noted that, where there is no conflict, the embodiments of the present application and the features in the embodiments may be combined with one another.

The terms "first," "second," "third," etc. are only configured to differentiate the description and should not be understood as indicating or implying relative importance.

In the description, it should also be noted that, unless otherwise expressly specified and limited, the terms "arranged," "installed," "connected," and "combined" should be understood in a broad sense; for example, it may be a fixing connection, it can also be a detachable connection or an integral connection; it can be a mechanical connection or an electrical connection; it can be a direct connection or an indirect connection through an intermediate media, and it can be internal connection within two components. For those of ordinary skill in this field, the meanings of the above terms in the present invention can be understood in specific situations.

The specific embodiments of the present invention will be described in detail below with reference to the accompanying drawings. It should be understood that the specific embodiments described herein are merely for illustrating and explaining the present invention, and are not intended to limit the present invention.

Embodiment 1

As shown in FIG. 1, an easy-to-install vehicle cover comprising a support system 1, a guide rail system 2, a front bar system 3, a rotating shaft system, a rear bar 6, a latch system 7, and side rails 8, the front bar system 3, the rotating shaft system, and the rear bar 6 together form a transverse frame of the vehicle cover, and the side rails 8 are connected to two ends of the transverse frame via joints, thereby forming a longitudinal frame of the vehicle cover; the joints comprise all joints that connected to the front bar system, the rotating shaft system, and the rear bar.

The latch system 7 comprises two latch assemblies, which are connected to each other by a steel wire rope 76, each latch assembly comprises a latch 72, a first outer frame 73, a second outer frame 74, and a spring 77;

The first outer frame 73 is connected to the second outer frame 74, the steel wire rope 76 passes through the first outer frame 73 and the second outer frame 74, and two ends of the steel wire rope 76 are respectively connected to the two latches 72, the spring 77 is sleeved on the steel wire rope 76 and is located within a cavity of the first outer frame 73, the two ends of the spring 77 respectively abut against the latch 72 and the second outer frame 74, the first outer frame 73 is connected with a gasket 71, wherein the gasket 71 is higher than the first outer frame 73, so that during flipping of the vehicle cover, the gasket 71 provides effective cushioning to avoid rigid contact between the vehicle cover and the latch.

The guide rail system 2 is connected with a limiting frame 78, and the limiting frame 78 is configured to limit the latch 72 connected to the front bar system 3. By providing the limiting frame 78 to limit the latch 72 on the front bar system 3, positioning of the entire vehicle cover is achieved, moreover, by providing the latch system 7, the vehicle cover can be connected to the guide rail system 2 simply by pressing, thereby on one hand, the latch 72 is received within the limiting frame 78 to complete positioning of the vehicle cover, and on the other hand, the latch 72 is engaged with the guide rail system 2 to complete connection between the front bar system 3 and the guide rail system 2.

The steel wire rope 76 is connected with a handle webbing 75. The handle webbing 75 is located between the first outer frame 73 and the second outer frame 74, when the handle webbing 75 is pulled, the steel wire rope 76 drives the two latches 72 to retract, thereby separating the latches 72 from the side rails 8 and realizing unlocking.

Embodiment 2

On the basis of Embodiment 1, the front bar system 3 comprises a first front bar 31, a second front bar 32, a third front bar 34, a front bar rubber strip 33, front bar joints 35, a front bar buckle head 36, a front bar rotating shaft joint 37, and joint screws 38;

the first front bar 31 and the second front bar 32 are bonded together, with two ends of the first front bar 31 and two ends of the second front bar 32 fixed by the front bar joints 35 (the first front bar 31 and the second front bar 32 are both profiles and require the front bar joints 35 to be connected at their ends, and the front bar joints 35 are connected to the side rails 8);

the second front bar 32 and the third front bar 34 are connected by a rotating shaft structure, a front bar rubber strip 33 is arranged between the second front bar 32 and the third front bar 34; the front bar rubber strip 33 is configured to prevent water from entering the rotating shaft of the vehicle cover. The front bar rubber strip 33 comprises a rubber strip blade 3301, and the rubber strip blade 3301 is connected with two T-shaped rubber strip insertion heads 3302, which are respectively connected to the second front bar 32 and the third front bar 34, the rubber strip blade 3301 is located on an upper side of the rotating shaft structure.

The front bar buckle head 36 is connected to the first front bar 31 and the second front bar 32, the front bar rotating shaft joints 37 are connected to two ends of the third front bar 34, the joint screws 38 pass through the front bar joints 35 and are connected to the guide rail system 2, so as to fix the front bar system 3 to the guide rail system 2. Specifically, the guide rail system 2 comprises a guide rail 21, which has a guide rail waist hole 2101, a joint screw 38 passes through the front bar joint 35 and the guide rail waist hole 2101 from top to bottom, and a connecting nut is fixed below the guide rail waist hole 2101.

The front bar joints 35 are connected to the first front bar 31 and the second front bar 32, since the first front bar 31 and the second front bar 32 do not need to rotate and only need stable connection, joint fixing holes 3501 are provided on the front bar joint 35, allowing the front bar joints 35 to connected with the guide rail 21 by joint screws 38. In addition, edges of the joint fixing holes 3501 are higher than an upper plane of the front bar joint 35, which prevents rainwater from flowing into the fixing holes 3501 in rainy days, providing excellent waterproofing performance. The joint fixing hole 3501 is equipped with a joint screw washer 310, which can tighten the joint screw 38 on the one hand, and fill the recessed area inside the joint fixing hole 3501 on the other hand to prevent water accumulation.

The front bar buckle head 36 is provided with an insertion opening 3602, a support groove 3605, and a buckle head groove 3604, the insertion opening 3602 is configured to connect a buckle, a drainage outlet 3601 is formed at the bottom of the support groove 3605, and the buckle head groove 3604 is configured to mount a support gasket. The insertion opening 3602 is configured to connect a webbing, wherein one end of the webbing is connected to the vehicle cover, and the other end is provided with a buckle matched with the insertion opening 3602. Since the vehicle cover needs to be supported on the support gasket after being fully erected, extra support groove 3605 is provided to enhance strength of the front bar buckle head 36 and prevent deformation of the insertion opening 3602, the central reinforcing rib further strength of the front bar buckle head 36. To prevent water accumulation in the support groove 3605, the drainage outlet 3601 is provided near the bottom of the support groove 3605 to discharge accumulated water.

The front bar buckle head 36 is provided with a fixing threaded hole 3603 and is connected to the front bar system 3 through the fixing threaded hole 3603.

Embodiment 3

On the basis of Embodiment 2, the second front bar 32 is provided with a second front bar circular hook 3201 and a second front bar adhesive surface 3204, an end of the second front bar circular hook 3201 is provided with a protruding blocking head 3202, the third front bar 34 is provided with a third front bar rotating shaft 3401 and a stepped protrusion 3402, the second front bar circular hook 3201 is rotatably connected to the third front bar rotating shaft 3401, and the second front bar circular hook 3201 rotates about the third front bar rotating shaft 3401, the protruding blocking head 3202 and the stepped protrusion 3402 form a blocking structure, when the protruding blocking head 3202 abuts against the stepped protrusion 3402, the second front bar 32 rotates to a maximum rotation angle.

Embodiment 4

On the basis of Embodiment 3, the first front bar 31 is provided with a first front bar adhesive surface 3101, a C-shaped groove 3102, a first rubber strip insertion opening 3105, a first connection port 3103, and a second connection port 3104, the first front bar adhesive surface 3101 is bonded with the second front bar adhesive surface 3204 by glue;

the C-shaped groove 3102 is configured to connect the latch system 7, and the opening of the C-shaped groove 3102 is arranged facing downward for connection with the latch system.

Embodiment 5

On the basis of Embodiment 4, the front bar joint 35 is provided with a joint insertion head 3503 and a joint screw hole 3504;

the first connection port 3103 is configured to connect the joint screw hole 3504, the second connection port 3104 is configured to connect the joint insertion head 3503, wherein the second connection port 3104 has a substantially semicircular structure.

There are two first connection ports 3103, which are located on both sides of the C-shaped groove 3102, and the two second connection ports 3104 are located on the side of the first connection port 3103 away from the C-shaped groove 3102.

That is, the first front bar 31 is arranged as: second connection port 3104, first connection port 3103, C-shaped groove 3102, first connection port 3103, second connection port 3104 from left to right.

The first rubber strip insertion opening 3105 is connected with a rubber strip and is provided with an anti-detachment protrusion (not shown).

The rubber strip connected to the first rubber strip insertion opening 3105 is located at an end of a cargo hopper, and part of the rubber strip extends between a cab and the cargo hopper, which effectively cover the cargo hopper and thereby deliver superior waterproofing performance.

The front bar joint 35 comprises a joint fixing hole 3501, a C-shaped rubber-through joint hole 3502, a joint insertion head 3503, a joint screw hole 3504, a gasket area 3505, a profile connection protrusion 3506, reinforcing ribs 3507, and a joint insertion area 3508.

The C-shaped rubber-through joint hole 3502 is configured to connect the T-shaped rubber strip insertion head 3302 of the front bar rubber strip 33, wherein the front bar rubber strip 33 connects the second and third front bars 33, 34 and mainly serves a waterproof function, here, the front bar rubber strip 33 further connects to the front bar joint 35, enhancing the integrity between the front bar joint 35 and the second front bar 32 to form a continuous waterproof strip, the joint insertion area 3508 is configured to connect the rubber strip blade 3301 of the front bar rubber strip 33, the two engagements between the front rubber strip 33 and the front point 35 are equivalent to two waterproofing actions, which deliver better waterproofing performance, during installation, a lower portion of the T-shaped rubber strip insertion head is inserted into the C-shaped rubber-through rubber hole, and the rubber strip blade is inserted into the joint insertion area;

The profile-connecting protrusion 3506 is inserted into a second front bar insertion 3203 of the second front bar 32, forming a mating connection structure 7402 between the front bar joint 35 and the second front bar insertion 3203, thereby improving connection stability.

The gasket area 3505 is configured to mount a joint screw washer 310, and the edge of the gasket area 3505 is higher than a plane of the front bar joint 35, thus providing excellent waterproof performance. After the installation of the joint screw washer 310, the gasket area 3505 will not feature any recessed structures and is less prone to water accumulation.

The joint fixing hole 3501 is configured to connect the joint screws 38. The reinforcing ribs 3507 serves as a reinforcing structure of the front bar joint 35.

Embodiment 6

On the basis of Embodiment 5, the second outer frame 74 comprises a spring groove 7401, a connecting structure 7402, a steel wire through-hole 7403, a second abutting portion 7404, a positioning screw 7405, and a second base 7406;

the second base 7406 forms a bottom of the second outer frame 74, the second abutting portion 7404 cooperates with the C-shaped groove 3102 of the first front bar 31, wherein the second abutting portion 7404 is located within the C-shaped groove 3102 and is only movable along an axial direction of the C-shaped groove 3102, thus to limit the second outer frame 74 on the first front bar 31.

The positioning screw 7405 fixes the second outer frame 74 to the C-shaped groove 3102, (in actual installation, first put the second outer frame 74 into the C-shaped groove 3102, then move the second outer frame 74 to a suitable position, and finally connect the positioning screw 7405 to the second outer frame 74 to fix the second outer frame 74 to the first front bar 31). The steel wire through-hole 7403 is configured for threading the steel wire rope 76 and to provide support for the steel wire rope 76.

The spring groove 7401 is configured to accommodate the spring 77, the spring groove 7401 is connected to the second base 7406 through the connecting structure 7402.

Embodiment 7

On the basis of Embodiment 6, the latch 72 comprises a set screw hole 7201, a latch head 7202, and a steel wire hole 7203, the set screw hole 7201 is configured to connect the positioning screw 7405, the latch head 7202 serves as a locking structure of the latch 72, and the steel wire hole 7203 is configured to connect the steel wire rope 76. The lower side of the latch head 7202 features a beveled surface, while the upper side of the latch head 7202 is flat, during locking, the beveled surface of the latch head 7202 is compressed by the side rail, causing it to retract, once the flat surface of the latch head 7202 passes over the side rail 8, the latch head 7202 extends and engages with the side rail 8 via its flat surface, in actual operation, the lock limiting frame 78 limits the movement of the lock head 7202.

The steel wire rope 76 extends into the steel wire hole 7203 and is pressed and fixed within the steel wire hole 7203 by the positioning screw 7405, thereby realizing connection between the steel wire rope 76 and the latch head 7202. This connection structure 7402 is more convenient and eliminates a conventional steel wire rope 76 clamping structure, in the prior art, steel wire ropes 76 pass through the latch head 7202 and are the fixed at both ends of the latch head 7202 by steel wire rope retainer, which is relatively complex. This application not only optimizes the structure of the latch head but also eliminates the need for steel wire rope retainer.

The first outer frame 73 comprises a latch screw hole 7301, a positioning threaded hole 7302, a latch hole 7303, a first abutting portion 7304, latch reinforcing ribs 7305, and a first base 7306;

the first base 7306 forms a bottom of the first outer frame 73, the positioning threaded hole 7302 is configured to fix the first outer frame 73 to the C-shaped groove 3102;

the latch screw hole 7301 is configured to tighten the positioning screw 7405 into the set screw hole 7201, since the connection between the wire rope 76 and the latch head 7202 requires the positioning screw 7405 to be fixed, the latch screw hole 7301 is provided on the first outer frame 73 to facilitate the tightening of the set screw.

The first abutting portion 7304 is located within the C-shaped groove 3102 and limits the first outer frame 73 within the C-shaped groove 3102, the latch hole 7303 is configured to accommodate the latch 72 and serves as a sliding hole for the latch 72, the latch reinforcing ribs 7305 serve as reinforcing structures of the first outer frame 73.

Embodiment 8

On the basis of Embodiment 7, the rotating shaft system comprises a first rotating shaft 4 and a second rotating shaft 5, both the first rotating shaft 4 and the second rotating shaft 5 are provided with a rotating rod 41, and the rotating rod 4 is provided with a rotating rod locking groove 4101, the first front bar 31 is provided with a C-shaped groove 3102, the rear bar 6 is provided with a rear bar groove 61;

the latch system 7 is connected with the C-shaped groove 3102, the rotating rod locking groove 4101, and the rear bar groove 61.

The rotating rod locking groove 4101, C-shaped groove 3102, and rear bar groove 61 mentioned here only need to be able to accommodate the latch system 7, just like the C-shaped groove 3102.

Embodiment 9

On the basis of Embodiment 8, the vehicle cover further comprises a front bar anti-detachment system 39, the front bar anti-detachment system 39 comprises an anti-detachment handle 3901, an anti-detachment webbing 3902, and a buckle 3903;

the guide rail system 2 comprises guide rails 21, the guide rails 21 are provided with guide rail clamps 2102, the guide rail clamps 2102 are provided with webbing fixing holes 21021, the buckle 3903 is connected to the webbing fixing hole 21021, the anti-detachment handle 3901 is connected to the first bottom portion 3205 of the second front bar 32, one end of the anti-detachment webbing 3902 is connected to the anti-detachment handle 3901, while the other end of the anti-detachment webbing 3902 is connected to the buckle 3903, the anti-detachment webbing 3902 is made of a flexible material.

Embodiment 10

On the basis of Embodiment 9, the support system 1 comprises an upper base 11, a lower base 12, a first nut 13, a second nut 14, a fork nut 15, a fully threaded bolt 16, a threaded portion 1601, and a knurled nut 17;

the upper base 11 is provided with screw fixing holes 1105, and is fixed to the third front bar 34 through the screw fixing holes 1105;

the lower base 12 is provided with a fixing slider 1203, the fixing slider 1203 extends into the C-shaped groove 3102 of the first front bar 31 and is fixed to the second front bar 32 by screws;

the lower base 12 and the upper base 11 are connected by the fork nut 15 and the fully threaded bolt 16, a threaded portion 1501 of the fork nut 15 extends into a circular hole 1102 of the upper base 11, the fork nut 15 slides along the circular hole 1102, the fork nut 15 is sleeved with the knurled nut 17, and the knurled nut 17 is in threaded engagement with the threaded portion 1501, the fork nut 15 and the knurled nut 17 are arranged within a first mounting area 1103 and a second mounting area 1104, wherein the second mounting area 1104 is larger than the first mounting area 1103, the knurled nut 17 abuts against a nut top surface 1106 of the upper base 11, thereby forming a triangular structure. The outer wall of the knurled nut 17 is a knurled outer wall 1701, which is convenient for manual rotation and adjustment, while the inner wall of the knurled nut 17 is a threaded inner wall 1702, which is threaded to the threaded portion 1501 and can be locked by the thread.

The upper base 11 is provided with an upper base step 1101, since the center of vehicle cover profile needs to connect to a panel, the thickness between the panel and the edge of the profile varies. To ensure better alignment between the upper base step 1101 and the vehicle cover, this step is provided.

The lower base 12 is provided with an mounting space 1201, a base fixing hole 1202, a lower base wire hole 1204, and a lower base circular hole 1205, the lower base 12 is fixed to the first front bar 31 via the base fixing hole 1202, the second nut 14 is positioned within the mounting space 1202, the base fixing hole 1202 is used to pass through the full-thread bolt 16, while the lower base wire hole 1204 allows passage of the steel wire rope 76. Since the front bar system 3 needs to be connected to the latch system 7, the lower base wire hole 1204 is provided to facilitate the routing of the wire rope 76.

When the knurled nut 17 moves on the fork nut 15 toward the upper base 11, a minimum included angle c is formed between a fixed portion and a rotating portion of the vehicle cover, while the fork-type nut 5 has a maximum thread pitch C;

When the knurled nut 17 moves away from the upper base 11, a maximum included angle a is formed between the fixed portion and the rotating portion, while the fork-type nut 5 has a minimum thread pitch A;

When the knurled nut 7 moves along the fork-type nut 5, the angle b between the vehicle cover fixing portion and the rotating portion varies between a and c, while the thread pitch B of the fork-type nut 5 varies between A and C, where a>b>c and A<B<C.

Due to the stability of a triangle, when the angle between the vehicle cover fixing portion and the vehicle cover rotating portion falls within the range between a and c, the knurled nut 7 can support the rotating portion at any position, in other words, the knurled nut 7 can support the rotating part at any angle between the angle a-c between it and the fixed part, and can ensure the stability of the vehicle cover.

Embodiment 11

On the basis of Embodiment 10, the fork nut 15 comprises a threaded portion 1501, a C-shaped head 1502, an intermediate cylinder 1503, a connection hole 1504, and a retaining ring 1505;

The fully threaded bolt 16 is provided with a threaded portion 1601 and a threaded bolt hole 1602;

the threaded bolt hole 1602 passes through the intermediate cylinder 1503, the intermediate cylinder 1503 is fixed to the C-shaped head 1502, the connection hole 1504 is provided on the intermediate cylinder 1503, the retaining ring 1505 passes through the connection hole 1504 and locks the intermediate cylinder 1503 to the C-shaped head 1502.

The invention is not limited to the above-mentioned optional embodiments. Anyone can come up with various other forms of products under the inspiration of the invention, however, regardless of any changes in its shape or structure. All technical solutions that fall within the scope defined by the claims of the present invention shall fall within the scope of protection of the invention.

What is claimed is:

1. A vehicle cover, comprising:

a guide rail system (2), a front bar system (3), a rotating shaft system, a rear bar (6), a latch system (7), and side rails (8), wherein the front bar system (3), the rotating shaft system, and the rear bar (6) together form a transverse frame of the vehicle cover, the side rails (8) and joints are connected to two ends of the transverse frame to form a longitudinal frame of the vehicle cover;

wherein the latch system (7) comprises two latch assemblies, which are connected by a steel wire rope (76), each latch assembly comprises a latch (72), a first outer frame (73), a second outer frame (74), and a spring (77), wherein the first outer frame (73) is connected to the second outer frame (74), the steel wire rope (76) passes through the first outer frame (73) and the second outer frame (74), the two ends of the steel wire rope (76) are respectively connected to the two latches (72), wherein the spring (77) is sleeved on the steel wire rope (76) and is located within a cavity of the first outer frame (73), the two ends of the spring (77) respectively abut against the latch (72) and the second outer frame (74), wherein the first outer frame (73) is connected with a gasket (71), and the steel wire rope (76) is connected with a pull webbing (75);

wherein the guide rail system (2) is connected with a limiting frame (78), wherein the limiting frame (78) is configured to limit the latch (72) connected to the front bar system (3).

2. The vehicle cover according to claim 1, wherein the front bar system (3) comprises a first front bar (31), a second front bar (32), a third front bar (34), a front bar rubber strip (33), front bar joints (35), a front bar buckle head (36), front bar rotating shaft joints (37), and joint screws (38);

wherein the first front bar (31) and the second front bar (32) are bonded together, with two ends of the first front bar (31) and two ends of the second front bar (32) fixed by the front bar joints (35);

wherein the second front bar (32) and the third front bar (34) are connected through a rotating shaft structure, the front bar rubber strip (33) is arranged between the second front bar (32) and the third front bar (34); the front bar rubber strip (33) is configured to prevent water from entering a rotating shaft of the vehicle cover;

wherein the front bar joints (35) are connected to the first front bar (31) and the second front bar (32);

wherein the front bar buckle head (36) is provided with an insertion opening (3602), a support groove (3605), and a buckle head groove (3604), wherein the insertion opening (3602) is configured to connect a buckle, a drainage outlet (3601) is formed at a bottom of the support groove (3605), and the buckle head groove (3604) is configured to mount a support gasket.

3. The vehicle cover according to claim 2, wherein the second front bar (32) is provided with a second front bar circular hook (3201) and a second front bar adhesive surface (3204), wherein an end of the second front bar circular hook (3201) is provided with a protruding blocking head (3202); the third front bar (34) is provided with a third front bar rotating shaft (3401) and a stepped protrusion (3402), wherein the second front bar circular hook (3201) is rotatably connected with the third front bar rotating shaft (3401), wherein the protruding blocking head (3202) and the stepped protrusion (3402) form a blocking structure, thereby when the protruding blocking head (3202) abuts against the stepped protrusion (3402), the second front bar (32) rotates to a maximum rotation angle.

4. The vehicle cover according to claim 3, wherein the first front bar (31) is provided with a first front bar adhesive surface (3101), a C-shaped groove (3102), a first rubber strip insertion opening (3105), a first connection port (3103), and a second connection port (3104);

wherein the first front bar adhesive surface (3101) is bonded with the second front bar adhesive surface (3204) by glue;

the C-shaped groove (3102) is configured to connect the latch system (7);

the front bar joint (35) is provided with a joint insertion head (3503) and a joint screw hole (3504);

the first connection port (3103) is configured to connect the joint screw hole (3504), and the second connection port (3104) is configured to connect the joint insertion head (3503); and the first rubber strip insertion opening (3105) is connected with a rubber strip, and the first rubber strip insertion opening (3105) is provided with an anti-detachment protrusion.

5. The vehicle cover according to claim 4, wherein the front bar joint (35) comprises a joint fixing hole (3501), a C-shaped rubber-through joint hole (3502), a joint insertion head (3503), a joint screw hole (3504), a gasket area (3505), a profile-connecting protrusion (3506), a joint reinforcing rib (3507), and a joint insertion area (3508); wherein the C-shaped rubber-through joint hole (3502) is configured to connect a T-shaped insertion head (3302) of the front bar rubber strip (33);

the joint insertion area (3508) is configured to connect a rubber strip blade (3301) of the front bar rubber strip (33);

the profile-connecting protrusion (3506) is inserted into a second front bar insertion (3203) of the second front bar (32);

the gasket area (3505) is configured to mount a joint screw washer (310), an edge of the gasket area (3505) is higher than a plane of the front bar joint (35);

the joint fixing hole (3501) is configured to connect a joint screw (38); and the joint reinforcing rib (3507) serves as a reinforcing structure of the front bar joint (35).

6. The vehicle cover according to claim 5, wherein the second outer frame (74) comprises a spring groove (7401), a connecting structure (7402), a steel wire through-hole (7403), a second abutting portion (7404), a positioning screw (7405), and a second base (7406); wherein the second base (7406) forms a bottom of the second outer frame (74), the second abutting portion (7404) cooperates with the C-shaped groove (3102) of the first front bar (31) to limit the second outer frame (74) on the first front bar (31);

the positioning screw (7405) fixes the second outer frame (74) to the C-shaped groove (3102);

the steel wire through-hole (7403) is configured for threading the steel wire rope (76) and to support the steel wire rope (76); and the spring groove (7401) is configured to accommodate the spring (77), and the spring groove (7401) is connected to the second base (7406) through the connecting structure (7402).

7. The vehicle cover according to claim 6, wherein the latch (72) comprises a set screw hole (7201), a latch head (7202), and a steel wire hole (7203);

wherein the set screw hole (7201) is configured to connect the positioning screw (7405), the latch head (7202) serves as a locking structure of the latch (72), and the steel wire hole (7203) is configured to connect the steel wire rope (76).

8. The vehicle cover according to claim 7, wherein the first outer frame (73) comprises a latch screw hole (7301), a positioning threaded hole (7302), a latch hole (7303), a first abutting portion (7304), latch reinforcing ribs (7305), and a first base (7306); wherein the first base (7306) forms a bottom of the first outer frame (73), the positioning threaded hole (7302) is configured to fix the first outer frame (73) to the C-shaped groove (3102);

the latch screw hole (7301) is configured to tighten the positioning screw (7405) into the set screw hole (7201);

the first abutting portion (7304) is located within the C-shaped groove (3102) and limits the first outer frame (73) within the C-shaped groove (3102), the latch hole (7303) is configured to accommodate the latch (72), the latch hole (7303) is a sliding hole for the latch (72), the latch reinforcing ribs (7305) serve as a reinforcing structure of the first outer frame (73).

9. The vehicle cover according to claim 2, wherein the rotating shaft system is provided with a rotating rod locking groove (4101), the first front bar (31) is provided with a C-shaped groove (3102), the rear bar (6) is provided with a rear bar groove (61); and the latch system (7) is connected with the C-shaped groove (3102), the rotating rod locking groove (4101), and the rear bar groove (61).

10. The vehicle cover according to claim 2, wherein the vehicle cover further comprises a front bar anti-detachment system (39), the front bar anti-detachment system (39) comprises an anti-detachment handle (3901), an anti-detachment webbing (3902), and a buckle (3903); wherein the guide rail system (2) comprises guide rails (21), the guide rails (21) are connected with guide rail clamps (2102), the guide rail clamps (2102) are provided with webbing fixing holes (21021), the buckle (3903) is connected to the webbing fixing holes (21021), the anti-detachment handle (3901) is connected to a first bottom portion (3205) of the second front bar (32), one end of the anti-detachment webbing (3902) is connected to the anti-detachment handle (3901), while another end of the anti-detachment webbing (3902) is connected to the buckle (3903), wherein the anti-detachment webbing (3902) is made of a flexible material.

11. The vehicle cover according to claim 4, wherein the vehicle cover further comprises a support system (1), the support system (1) comprises an upper base (11), a lower base (12), a first nut (13), a second nut (14), a fork nut (15), a fully threaded bolt (16), a threaded portion (1601), and a knurled nut (17); wherein the upper base (11) is provided with screw fixing holes (1105), and the upper base (11) is connected to the third front bar (34) through the screw fixing holes (1105);

the lower base (12) is provided with a fixing slider (1203), the fixing slider (1203) extends into the C-shaped groove (3102) of the first front bar (31) and being fixed to the second front bar (32) by screws;

the lower base (12) and the upper base (11) are connected by the fork nut (15) and the fully threaded bolt (16), a threaded portion (1501) of the fork nut (15) extends into a circular hole (1102) of the upper base (11), and the fork nut (15) slides along the circular hole (1102), the fork nut (15) is sleeved with the knurled nut (17), and the knurled nut (17) is in threaded engagement with the threaded portion (1501), the fork nut (15) and the knurled nut (17) are arranged within a first mounting area (1103) and a second mounting area (1104), wherein the second mounting area (1104) is larger than the first mounting area (1103), the knurled nut (17) abuts against a nut abutting surface (1106) of the upper base (11), thereby forming a triangular structure.

12. The vehicle cover according to claim 11, wherein the fork nut (15) comprises a threaded portion (1501), a C-shaped head (1502), an intermediate cylinder (1503), a connection hole (1504), and a retaining ring (1505); wherein the fully threaded bolt (16) is provided with a threaded portion (1601) and a threaded bolt hole (1602);

the threaded bolt hole (1602) passes through the intermediate cylinder (1503), the intermediate cylinder (1503) is fixed to the C-shaped head (1502), the connection hole (1504) is provided on the intermediate cylinder (1503); the retaining ring (1505) passes through the connection hole (1504) and locks the intermediate cylinder (1503) to the C-shaped head (1502).

* * * * *